United States Patent
Fukuda et al.

(10) Patent No.: US 6,532,262 B1
(45) Date of Patent: Mar. 11, 2003

(54) CODING METHOD AND APPARATUS AND RECORDER

(75) Inventors: Hideki Fukuda, Nara (JP); Hideaki Shibata, Osaka (JP); Kazuhiko Nakamura, Osaka (JP); Satoshi Kondo, Kyoto (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/357,887

(22) Filed: Jul. 21, 1999

(30) Foreign Application Priority Data

Jul. 22, 1998 (JP) ............................................. 10-206004

(51) Int. Cl.[7] ............................................. H04N 11/02
(52) U.S. Cl. .......................... 375/240.03; 375/240.05; 375/240.27
(58) Field of Search ...................... 375/240, 240.03, 375/240.05, 240.27; 348/406.1, 419.1; 382/251

(56) References Cited

U.S. PATENT DOCUMENTS

| | | | | |
|---|---|---|---|---|
| 5,650,860 A | * | 7/1997 | Uz | ............................... 358/430 |
| 5,844,607 A | * | 12/1998 | Gebler et al. | ............... 348/390 |
| 6,115,420 A | * | 9/2000 | Wang | ........................... 375/240 |
| 6,118,817 A | * | 9/2000 | Wang | ........................... 375/240 |
| 6,317,459 B1 | * | 11/2001 | Wang | ...................... 375/240.12 |

FOREIGN PATENT DOCUMENTS

JP          10-215460          8/1998

* cited by examiner

*Primary Examiner*—Vu Le
*Assistant Examiner*—George A. Bugg
(74) *Attorney, Agent, or Firm*—Nixon Peabody LLP; Thomas W. Cole

(57) ABSTRACT

A coder of the present invention is adapted to reproduce a signal of quality at a low coding rate even when a video or audio signal continuously supplied thereto should be coded in real time. The coder includes: a quantizer for quantizing the input signal; an encoder for encoding the output of the quantizer and outputting coded data; and a quantization parameter supply circuit for supplying a quantization parameter to the quantizer. If a scene change detector has detected a scene change, the supply circuit supplies a quantization parameter, which has been determined adaptively to a scene newly appearing after the scene change, to the quantizer. Otherwise, the supply circuit supplies a quantization parameter, which has been determined at such a value as to stabilize a coding rate, to the quantizer. In this manner, an average coding rate can be controlled and coding processing can be performed adaptively to individual scenes.

23 Claims, 23 Drawing Sheets

CODING METHOD AND APPARATUS AND RECORDER

BACKGROUND OF THE INVENTION

The present invention relates to technology of coding a signal such as a video or audio signal and technology of recording coded data on a storage medium.

In coding a video signal, transform coding is usually employed. According to this technique, an image is divided into a plurality of blocks, each composed of a multiplicity of pixels neighboring each other, and an orthogonal transform, like discrete cosine transform, is performed on each of these blocks. Also, a transform coefficient is quantized based on a predetermined quantization unit (quantization parameter), and then compression-coded by a variable-length encoding technique such as Huffman coding.

Also, in coding a moving picture like a TV signal, inter-frame coding is performed by utilizing a correlation between frames. According to the inter-frame coding technique, an image at a frame to be coded is predicted using, as a reference frame, another frame preceding or succeeding the frame in question on the time axis, and a prediction error thereof is coded and transmitted or recorded. The inter-frame coding is performed on the basis of a block composed of a plurality of pixels. And the motion quantity of each block is also transmitted or recorded along with the prediction error.

FIG. 22 illustrates a coding technique according to the MPEG-2 (Moving Picture Experts Group) standard, which is an international standard of moving picture coding. According to the MPEG-2 standard, intra-frame coding, inter-frame forward predictive coding and inter-frame bidirectional coding are performed. A frame, on which intra-frame coding is performed, is called an "I-frame". A frame, on which inter-frame forward predictive coding is performed, is called a "P-frame". And a frame, on which inter-frame bidirectional coding is performed, is called a "B-frame". In a GOP (group of pictures) consisting of a plurality of frames, at least one of the frames is intra-frame-coded.

According to such a coding technique, variable-length encoding is employed, and therefore, the number of bits generated cannot be recognized accurately until the coding processing is over. Thus, feedback control is performed such that a cumulative error, which is an accumulation of errors between numbers of bits generated and target numbers of bits, becomes zero and that an average coding rate during a predetermined interval can be approximated at a target coding rate.

Also, a variable-rate coding technique for coding a video at a coding rate variable with the complexity of coding an individual scene thereof is lately applied to a DVD (digital video disc) and so on. According to this technique, a coding rate is increased for a scene with a high complexity of coding, thereby reducing coding noise. On the other hand, as to a scene with a low complexity of coding (such as a scene with little motion), the coding rate is decreased, thereby balancing the overall image quality of the video and reducing an average bit rate.

Variable-rate coding is implementable most easily by fixing a quantization parameter for quantization processing. If the quantization parameter is fixed, then the resolution of quantization is also fixed, but the coding rate for a scene with a high complexity of coding gets higher than a scene with a low complexity of coding. Accordingly, the coding rate becomes variable.

FIG. 23 is a block diagram illustrating a configuration for a conventional coder for controlling an average rate by a feedback control technique. As shown in FIG. 23, an input video signal is quantized by a quantizer 701 using a quantization parameter Q, which has been determined by a rate-controlling-parameter determiner 704. The output of the quantizer 701 is variable-length encoded by a variable-length encoder 702 and then output as coded data. A bit number calculator 703 calculates a number of bits B of the coded data generated per unit time t.

In the rate-controlling-parameter determiner 704, an error calculator 711 obtains an error d (=B−BT) by subtracting a target number of bits BT, which is derived from a target coding rate, from an actual number of bits generated B. A cumulative error calculator 712 accumulates the errors d, thereby obtaining a cumulative error D. A quantization parameter determiner 713 controls the quantization parameter Q such that the cumulative error D becomes zero.

If the cumulative error D is a positive large value, then the quantization parameter Q is increased to reduce the number of bits generated B. Conversely, if the cumulative error D is negative, then the quantization parameter Q is decreased to increase the number of bits generated B. The quantization parameter Q may be given by the following equation:

$$Q=Q'/(1-D/T)$$

where Q' is a quantization parameter used in previous quantization processing and T is a time constant used for the feedback control. During the interval T, the cumulative error D becomes zero and the average coding rate during the interval T can be controlled at the target coding rate.

In this case, by setting the time constant T at a sufficiently large value, variable-rate coding can be performed during the interval T. This is because if the time constant T is large enough, the quantization parameter Q hardly varies and is converged at a substantially constant value. As a result, a coding rate increases for a scene with a relatively high complexity of coding, but decreases for a scene with a relatively low complexity of coding. That is to say, coding processing can be performed at a rate variable with the complexity of coding an individual video scene.

The conventional coding processing with average rate control, however, has the following drawbacks.

The sensitivity of the human eyes to coding noise resulting from coding processing greatly differs depending on the complexity of coding an individual video scene. Specifically, coding noise generated in a scene with a low complexity of coding (e.g., a substantially uniform picture with almost no motion such as "blue sky") is more perceivable to the human eyes compared to a scene with a high complexity of coding (e.g., a complicated picture with a lot of motion such as "crowd"). In other words, the human vision is more sensitive to coding noise generated in a scene with a low complexity of coding than that of a scene with a high complexity of coding.

Thus, in coding a video with a substantially constant quantization parameter, even if a coding noise generated does not seriously affect the image quality of a scene with a high complexity of coding, non-negligible deterioration may be caused by the same noise in a scene with a low complexity of coding.

Also, in controlling an average coding rate according to a conventional technique, if a cumulative error is large when a scene with a high complexity of coding is changed into a scene with a low complexity of coding, the quantization parameter is controlled at a larger value. In a scene with a low complexity of coding, however, even if the quantization parameter is increased, the number of bits generated does not decrease so much. Thus, although the average coding rate can be controlled at a value closer to the target coding rate, deterioration in image quality might surpass the advantageous effects attained by the rate control.

Furthermore, the feedback control might cause oscillation in quantization parameter or number of bits generated, and the image quality might considerably change in such a case.

In general, optimum number of bits and quantization parameter may be determined for an individual scene by estimating the complexity of coding a signal in advance. In such a case, however, since an additional time is needed to estimate the complexity of coding, it is difficult to perform coding processing in real time.

SUMMARY OF THE INVENTION

An object of the present invention is to reproduce a signal of quality at a low coding rate even when a signal continuously supplied should be coded in real time.

Specifically, a method according to the present invention is adapted to code a signal, representing a video or being accompanied with a video, by quantization processing. The method includes the steps of: detecting a scene change in the video; if the scene change has been detected, determining a quantization parameter adaptively to a scene newly appearing after the scenes have been changed; or unless the scene change is detected, determining the quantization parameter at such a value as to stabilize a coding rate; and performing the quantization processing using the quantization parameter determined.

According to the present invention, the quantization parameter is controlled at such a value as to stabilize a coding rate within the same scene. On the other hand, if scenes have been changed, the quantization parameter is determined adaptively to the newly appearing scene. Thus, even if a continuously input signal should be coded in real time, coding processing can be performed adaptively to the individual scenes, while controlling an average coding rate at the same time. As a result, a well-balanced signal of good quality can be reproduced at an even lower coding rate.

In one embodiment of the present invention, if the scene change has been detected, the quantization parameter is preferably determined based on an assigned coefficient, corresponding to a complexity of coding the signal, and a number of bits generated and calculated during a predetermined interval after the scene change.

In another embodiment of the present invention, the assigned coefficient is preferably obtained based on an average of quantization parameters during a predetermined interval before the scene change is detected and an average of numbers of bits generated during the predetermined interval.

In still another embodiment, unless the scene change is detected, an accumulation of errors, each representing a difference between a number of bits generated and a target number of bits, is preferably obtained, and the quantization parameter is preferably determined by a feedback control using the accumulation.

In still another embodiment, a characteristic of the feedback control is preferably modified based on the errors.

In such an embodiment, the average rate can be controlled based on the complexity of coding an individual scene. Accordingly, it is possible to prevent the image quality of a scene with a low complexity of coding, in particular, from being deteriorated. In addition, the oscillation of the number of bits generated and quantization parameter can be suppressed during the feedback control.

In an alternate embodiment, a time passed since coding processing was started is preferably clocked, and the characteristic of the feedback control is preferably modified based on the passed time clocked.

In such an embodiment, the range of the variable coding rate may be broadened by performing the feedback control gently at the beginning of coding. As a result, the coding processing can be performed at a rate better suited to the individual scene. And if the feedback control is gradually enhanced along with the progress of coding processing, the average coding rate gets closer to the target coding rate, and the resulting error can be smaller when the coding processing is finished.

In still another embodiment, if the scene change has been detected, a distortion sensitivity of the newly appearing video after the scene change is preferably detected, and the quantization parameter is preferably determined based on the distortion sensitivity detected.

In such an embodiment, if the quantization parameter is decreased for a scene with a high distortion sensitivity and increased for a scene with a low distortion sensitivity, then the number of bits generated can be suppressed while making the overall image quality more uniform. As a result, a signal of quality can be reproduced at a low coding rate.

In still another embodiment, if the scene change has been detected, a distortion sensitivity of the video after the scene change is preferably detected. A first quantization parameter is preferably determined based on the distortion sensitivity detected. A number of bits generated is preferably calculated during a predetermined interval after the scene change, and a second quantization parameter is preferably determined based on the number of bits generated and calculated.

In still another embodiment, the coding method preferably further includes the step of estimating a storable capacity of a storage medium while recording coded data on the storage medium. And the quantization parameter is preferably determined considering the storable capacity estimated as well.

Another method according to the present invention is adapted to code a signal by quantization processing. The method includes the steps of: determining a quantization parameter based on an assigned coefficient, corresponding to a complexity of coding the signal, and a number of bits generated; and performing the quantization processing using the quantization parameter determined. The assigned coefficient is obtained based on an average of quantization parameters during a predetermined interval and an average of numbers of bits generated during the interval.

Still another method according to the present invention is adapted to code a signal by quantization processing. The method includes the steps of: obtaining an accumulation of errors, each representing a difference between a number of bits generated and a target number of bits; determining a quantization parameter by a feedback control using the accumulation; and performing the quantization processing using the quantization parameter determined. A characteristic of the feedback control is modified based on the errors.

Still another method according to the present invention is adapted to code a signal by quantization processing. The method includes the steps of: obtaining an accumulation of errors, each representing a difference between a number of bits generated and a target number of bits; determining a quantization parameter by a feedback control using the accumulation; and performing the quantization processing using the quantization parameter determined. A time passed since coding processing was started is clocked, and a characteristic of the feedback control is modified based on the passed time clocked.

Still another method according to the present invention is adapted to code a video signal by quantization processing. The method includes the steps of: detecting a distortion sensitivity of a video; determining a quantization parameter based on the distortion sensitivity detected; and performing the quantization processing using the quantization parameter determined.

A coder according to the present invention is adapted to code a signal representing a video or being accompanied with a video. The coder includes: a quantizer for quantizing the signal; an encoder for encoding the output of the quantizer and outputting coded data; means for supplying a quantization parameter to the quantizer; and means for detecting a scene change in the video. If the detecting means has detected the scene change, the supplying means supplies a quantization parameter, which has been determined adaptively to a scene newly appearing after the scene change, to the quantizer. Unless the detecting means detects the scene change, the supplying means supplies a quantization parameter, which has been determined at such a value as to stabilize a coding rate, to the quantizer.

According to the present invention, the quantization parameter supplying means supplies a quantization parameter at such a value as to stabilize a coding rate to the quantizer within the same scene. On the other hand, if scenes have been changed, the quantization parameter, which has been determined adaptively to the newly appearing scene, is supplied to the quantizer. Thus, even if a continuously input signal should be coded in real time, coding processing can be performed adaptively to the individual scenes, while controlling an average coding rate at the same time. As a result, a well-balanced signal of good quality can be reproduced at an even lower coding rate.

In one embodiment of the present invention, the coder preferably further includes a bit number calculator for calculating a number of bits of the coded data. When the detecting means detects the scene change, the supplying means preferably determines the quantization parameter based on an assigned coefficient, corresponding to a complexity of coding the signal, and the number of bits calculated by the calculator during a predetermined interval after the scene change.

In another embodiment of the present invention, the supplying means preferably obtains the assigned coefficient based on an average of quantization parameters during a predetermined interval before the scene change is detected and an average of numbers of bits generated during the predetermined interval.

In still another embodiment, unless the detecting means detects the scene change, the supplying means preferably obtains an accumulation of errors, each representing a difference between a number of bits generated and a target number of bits, and preferably determines the quantization parameter by a feedback control using the accumulation.

In still another embodiment, the supplying means preferably modifies a characteristic of the feedback control based on the errors.

In an alternate embodiment, the supplying means preferably clocks a time passed since coding processing was started, and preferably modifies the characteristic of the feedback control based on the passed time clocked.

In still another embodiment, when the detecting means detects the scene change, the supplying means preferably detects a distortion sensitivity of the video after the scene change, and preferably determines the quantization parameter based on the distortion sensitivity detected.

In still another embodiment, the coder preferably further includes a bit number calculator for calculating a number of bits of the coded data. When the detecting means detects the scene change, the supplying means preferably detects a distortion sensitivity of the video after the scene change, and preferably determines a first quantization parameter based on the distortion sensitivity detected. And after a predetermined interval has passed, the detecting means preferably determines a second quantization parameter based on the number of bits calculated by the bit number calculator.

A recorder according to the present invention is adapted to record a signal, representing a video or being accompanied with a video, on a storage medium. The recorder includes the coder of the present invention, and records the coded data, which has been output from the coder, on the storage medium.

According to the present invention, coded data, obtained by controlling the average coding rate and performing the coding processing adaptively to the individual scenes at the same time, is recorded on the storage medium. As a result, a signal of good quality can be reproduced at an even lower coding rate.

In one embodiment of the present invention, the recorder preferably further includes means for estimating a storable capacity of the storage medium. The means for supplying a quantization parameter of the coder preferably determines the quantization parameter considering the storable capacity estimated by the estimating means as well.

In such an embodiment, the quantization parameter for coding processing is determined based on the storable capacity of the storage medium. Accordingly, it is possible to record a signal on a storage medium with a limited storable capacity.

Another coder for coding a signal according to the present invention includes: a quantizer for quantizing the signal; an encoder for encoding the output of the quantizer and outputting coded data; a bit number calculator for calculating the number of bits of the coded data; and means for supplying a quantization parameter to the quantizer. The supplying means determines the quantization parameter based on an assigned coefficient, corresponding to a complexity of coding the signal, and the number of bits calculated by the bit number calculator, and obtains the assigned coefficient based on an average of quantization parameters during a predetermined interval and an average of numbers of bits generated during the interval.

Still another coder for coding a signal according to the present invention includes: a quantizer for quantizing the signal; an encoder for encoding the output of the quantizer and outputting coded data; a bit number calculator for calculating the number of bits of the coded data; and means for supplying a quantization parameter to the quantizer. The supplying means obtains an accumulation of errors, each representing a difference between a number of bits calculated by the bit number calculator and a target number of bits, determines the quantization parameter by a feedback control using the accumulation, and modifies a characteristic of the feedback control based on the errors.

Still another coder for coding a signal according to the present invention includes: a quantizer for quantizing the signal; an encoder for encoding the output of the quantizer and outputting coded data; a bit number calculator for calculating the number of bits of the coded data; and means for supplying a quantization parameter to the quantizer. The supplying means obtains an accumulation of errors, each representing a difference between a number of bits calculated by the bit number calculator and a target number of bits, determines the quantization parameter by a feedback control using the accumulation, clocks a time passed since coding processing was started, and modifies a characteristic of the feedback control based on the passed time clocked.

A video signal coder according to the present invention includes: a quantizer for quantizing the video signal; an encoder for encoding the output of the quantizer and outputting coded data; and means for supplying a quantization parameter to the quantizer. The supplying means detects a distortion sensitivity of a video, and determines the quantization parameter based on the distortion sensitivity detected.

BRIEF DESCRIPTION OF THE DRAWINGS

FIG. 2A illustrates a variation in complexity of coding respective frames; and

FIG. 2B illustrates respective quantization parameters selected.

DESCRIPTION OF THE PREFERRED EMBODIMENTS

Hereinafter, preferred embodiments of the present invention will be described with reference to the accompanying drawings. In the following embodiments, the present invention will be described as being applied to coding a video signal. Alternatively, any signal other than a video signal, e.g., an audio signal accompanied with a video, can also be processed similarly.

EMBODIMENT 1

Figure 1:
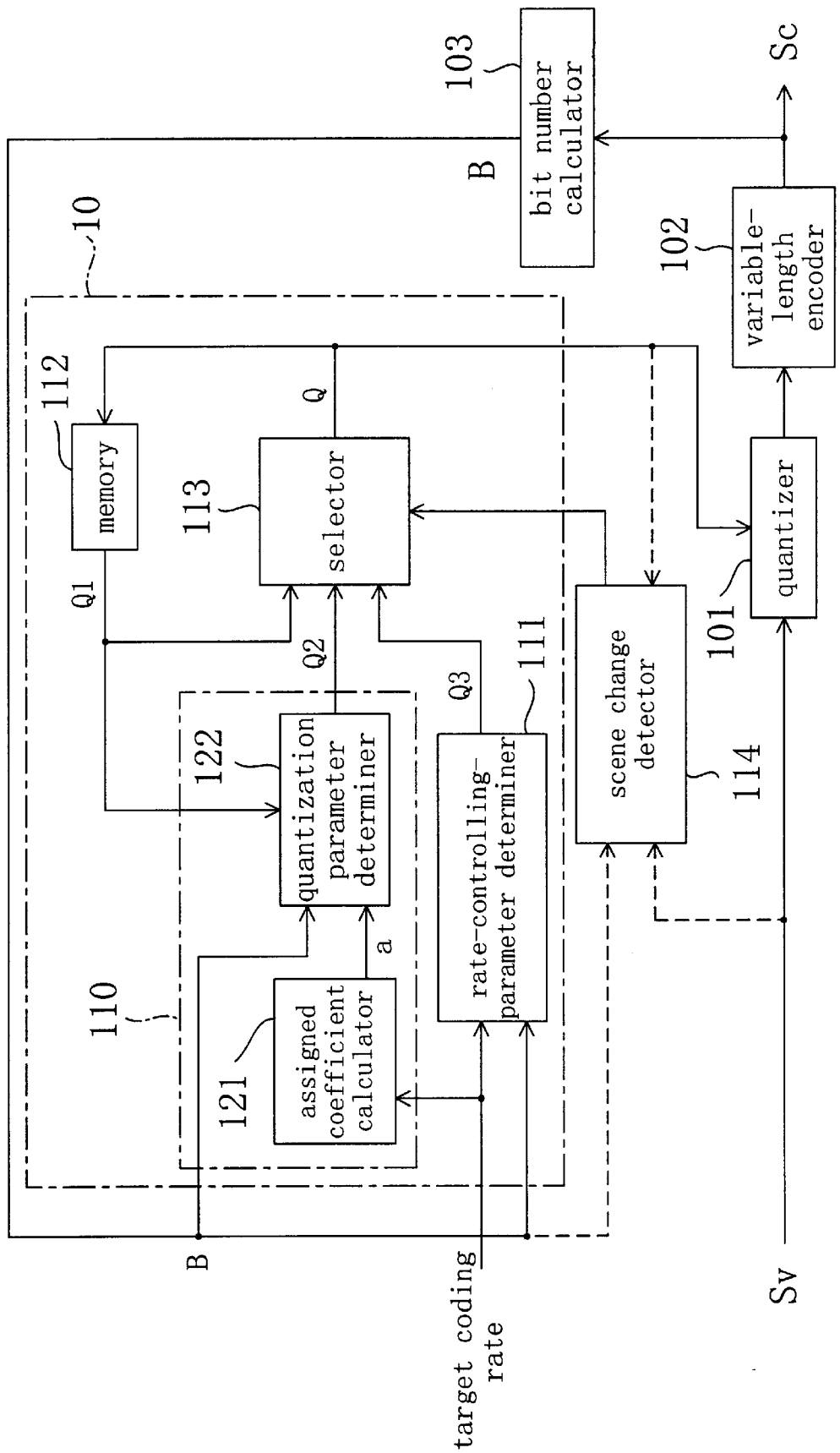
FIG. 1 is a block diagram illustrating a configuration for a coder according to a first embodiment of the present invention.

FIG. 1 is a block diagram illustrating a configuration for a coder according to a first embodiment of the present invention. As shown in FIG. 1, the coder includes: a quantizer 101; a variable-length encoder 102; a bit number calculator 103; a scene parameter determiner 110 for determining a quantization parameter; a rate-controlling-parameter determiner 111; a memory 112; a selector 113; and a scene change detector 114. The scene parameter determiner 110, rate-controlling-parameter determiner 111, memory 112 and selector 113 together constitute quantization parameter supplying means 10 as defined in the appended claims.

An input video signal Sv is quantized by the quantizer 101 using a quantization parameter Q, which is the output of the selector 113, variable-length encoded by the variable-length encoder 102 and then output as coded data Sc. The bit number calculator 103 calculates and outputs a number of bits B of the coded data generated during a predetermined interval.

The memory 112 stores thereon quantization parameters Q and outputs a quantization parameter Q, which was defined a predetermined time ahead, as a first quantization parameter Q1 to the selector 113. The scene parameter determiner 110 outputs a second quantization parameter Q2, which has been defined based on the complexities of coding individual scenes of the input video signal Sv that have been determined based on the scene information characterizing these scenes. The rate-controlling-parameter determiner 111 outputs a third quantization parameter Q3, which has been determined such that an average coding rate during the predetermined interval comes closer to a target coding rate.

The scene parameter determiner 110 determines the second quantization parameter Q2 depending on the complexity of coding by using the number of bits B of the coded data Sc generated during the predetermined interval as the scene information of the video signal Sv. For example, if the complexity is high, then the determiner 110 determines the quantization parameter Q2 at such a value as increasing the coding rate. The quantization parameter Q2 may be determined considering the target coding rate in addition to the complexity. For example, if the target coding rate is low, then the determiner 110 corrects the quantization parameter Q2 in such a manner as not to increase the coding rate too much even though the complexity is high. In this manner, it is possible to prevent the coding rate from being greatly deviated from the target coding rate.

The scene change detector 114 detects a scene change by calculating a variation between the frames of the input video signal Sv.

The selector 113 is controlled responsive to the output of the scene change detector 114. And the selector 113 selectively outputs, as the quantization parameter Q, any of the first, second and third quantization parameters Q1, Q2 and Q3, which are the outputs of the memory 112, scene parameter determiner 110 and rate-controlling-parameter determiner 11, respectively.

(Selection of Quantization Parameter)

The selector 113 usually selects the output Q1 of the memory 112, but occasionally selects the output Q3 of the rate-controlling-parameter determiner 111 at regular intervals. This is done to suppress deterioration in image quality by minimizing the variation in quantization parameter Q. For example, supposing intra-frame coding and inter-frame coding are performed alternately and periodically during the same coding processing, the output Q3 of the rate-controlling-parameter determiner 111 may be selected during the intervals in which the intra-frame coding is performed.

Also, if a scene change has been detected by the scene change detector 114, then the selector 113 selects the second quantization parameter Q2, which is the output of the scene Parameter determiner 110.

Figure 2:
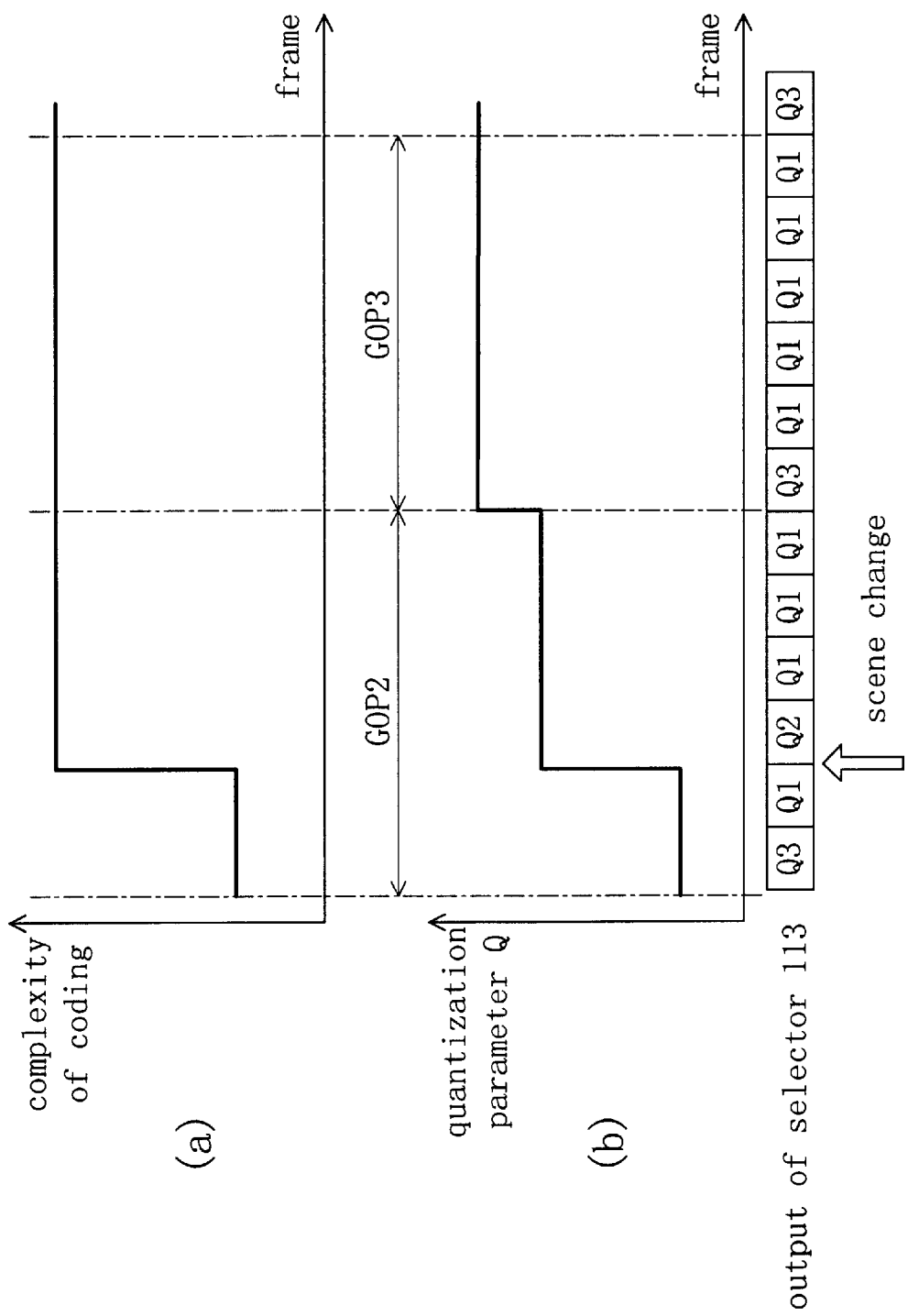
FIGS. 2A and 2B illustrate the operation of selecting a quantization parameter in the coder shown in FIG. 1.

FIGS. 2A and 2B illustrate the operation of the selector 113: FIG. 2A illustrates a variation in complexity of coding respective frames; and FIG. 2B illustrates respective quantization parameters Q selected. In the example shown in FIGS. 2A and 2B, scenes are supposed to be changed within a second group of pictures GOP2 and a newly appearing scene is supposed to have a high complexity of coding.

As shown in FIG. 2B, the selector 113 selects the output Q2 of the scene parameter determiner 110 at the first frame appearing after the scenes have been changed. Since the newly appearing scene is more difficult to code, the scene parameter determiner 110 determines the second quantization parameter Q2 in such a manner as to increase the coding rate. In general, to increase a coding rate of the same scene, the quantization parameter needs to be decreased. In a scene that is more difficult to code than other scenes, however, even if the quantization parameter is increased, a sufficiently high coding rate still can be attained. Accordingly, after the scenes have been changed, the second quantization parameter Q2 is set larger than the previous one as shown in FIG. 2B.

The second quantization parameter Q2, which is selected at the first frame appearing after the scene change, is stored on the memory 112. At the next frame, the selector 113 selectively outputs the quantization parameter Q2 that was stored on the memory 112 as Q1. In other words, the second quantization parameter Q2 that was stored on the memory 112 at the time of scene change is output as the quantization parameter Q. Thereafter, the output Q of the selector 113 is stored again in the memory 112. Accordingly, in the GOP2 coming up next to the scene change, the quantization parameter Q2, which was determined by the scene parameter determiner 110 at the time of scene change, is continuously used for quantization processing.

Next, at the first frame of GOP3, the selector 113 selects the output Q3 of the rate-controlling-parameter determiner 111. In the GOP2, the second quantization parameter Q2 is selected to increase the coding rate, since a scene with a higher complexity of coding newly appears at the time of scene change. However, in order to make the average coding rate as close to the target coding rate as possible, the coding rate should be restricted. Thus, the rate-controlling-parameter determiner 111 determines the third quantization parameter Q3 at a value larger than the previous one.

Thereafter, the third quantization parameter Q3 is stored on the memory 112. At the next frame, the selector 113 selectively outputs the quantization parameter Q3 that was stored on the memory 112 as Q1. In other words, the third quantization parameter Q3 that was stored on the memory 112 at the first frame of the GOP3 is output as the quantization parameter Q. Thereafter, the output of the selector 113 is stored again in the memory 112. Accordingly, the quantization parameter Q3, which was determined by the rate-controlling-parameter determiner 111 at the first frame of the GOP3, is continuously used for quantization processing in the GOP3.

In this illustrated example, the output Q3 of the rate-controlling-parameter determiner 111 is supposed to be selected every GOP. Alternatively, the output Q3 may be selected every predetermined number of frames.

In this manner, the average coding rate is controlled to come as close to the target coding rate as possible within the same scene, and if scenes have been changed, an appropriate quantization parameter, which is best suited to the complexity of coding the newly appearing scene, is selected. As a result, coding processing can be performed adaptively to the individual scenes, while controlling an average coding rate at the same time.

The coder shown in FIG. 1 is supposed to perform the quantization processing using the quantization parameter Q1, which was stored on the memory 112 a predetermined time ago. Alternatively, the selector 113 may always select the output Q3 of the rate-controlling-parameter determiner 111 within the same scene, and select the output Q2 of the scene parameter determiner 110 after the scenes have been changed.

(Determination of Quantization Parameter Best Suited to an Individual Scene)

The scene parameter determiner 110 includes an assigned coefficient calculator 121 and a quantization parameter determiner 122. The assigned coefficient calculator 121 outputs an assigned coefficient a in accordance with a predetermined target coding rate. The quantization parameter determiner 122 outputs the second quantization parameter Q2 best suited to an individual scene responsive to the quantization parameter Q1 stored on the memory 112 a predetermined time ago and output therefrom, the number of bits generated B and the assigned coefficient a output from the assigned coefficient calculator 121.

In the following example, it will be described how bit assignment can be performed in an optimized manner based on the relationship between the number of bits generated and the quantization parameter. Coding noise increases proportionally to the quantization parameter. Accordingly, to minimize the coding noise over the entire image, the sum of quantization parameters should be minimized. Then, the bits can be assigned in an optimized manner.

In general, the number of bits generated b and the quantization parameter q substantially meet the following relationship:

$$b = X/q$$

where X is a value called "complexity", representing how difficult to code a given image is, and is equal to the product of the number of bits generated b and the quantization parameter q. An individual image is associated with a unique complexity X. For example, two images meet the following equations.

Image 1: $b1=X1/q1$

Image 2: $b2=X2/q2$

In this example, a number of bits BT (=b1+b2) at such a value as minimizing the sum QA of quantization parameters (=q1+q2) is supposed to be assigned to these two images. In this case, $QA=q1+q2$ $\partial QA/\partial q1=1+\partial q2/\partial q1=0$ $\therefore q2/\partial q1=-1$     (1)

also, $BT=b1+b2=X1/q1+X2/q2$ $\partial BT/\partial q1=-X1/q1^2+\partial(X2/q2)/\partial q1=0$ $-X1/q1^2+\partial q2/\partial q1 \cdot \partial(X2/q2)/\partial q2=0$ when Equation (1) is substituted, $-X1/q1^2+X2/q2^2=0$ also, since X1=b1·q1 and X2=b2·q2, $-b1/q1+b2/q2=0$ $\therefore b1/q1=b2/q2=a$ (constant)

accordingly,
  b1=a×q1
  b2=a×q2

That is to say, the quantization parameters q1 and q2 and numbers of bits b1 and 2 at such values as minimizing the sum of quantization parameters can be defined at respective intersections between a line with an inclination a and the curves b=X1/q and b=X2/q.

In the foregoing example, the relationship between two images has been described. However, the same principle is applicable to three or more images. Thus, quantization parameters realizing an optimum bit assignment can be defined at respective intersections between the curve b=X/q, representing the relationship between the number of bits b derived for each image and quantization parameter. q, and the line with an inclination a.

In this case, the inclination a of the line corresponds to the assigned coefficient derived by the assigned coefficient calculator 121. The assigned coefficient a is determined depending on the average coding rate of the overall image and the type of each image (i.e., the complexity of coding). Accordingly, to obtain the assigned coefficient a precisely, the complexities of coding individual scenes included in the video signal to be coded should be estimated. However, the assigned coefficient a may be defined at a statistically approximated value for an ordinary video signal to be presented for a long time. In the following example, the assigned coefficient calculator 121 is supposed to calculate the assigned coefficient a based on only the target coding rate.

The quantization parameter determiner 122 obtains an intersection between the curve representing the following relationship between the quantization parameter Q1 that has been output from the memory 112 and the number of bits generated B that has been calculated by the bit number calculator 103

$b=X/q=(Q1 \times B)/q$ and the line with the inclination a derived by the assigned coefficient calculator 121, and outputs a quantization parameter corresponding to the intersection as the quantization parameter Q2. As a result, an optimum quantization parameter best suited to each scene can be obtained as the quantization parameter Q2.

It should be noted that the assigned coefficient a may also be obtained based on the quantization parameter Q1 and the number of bits generated B.

Figure 3:
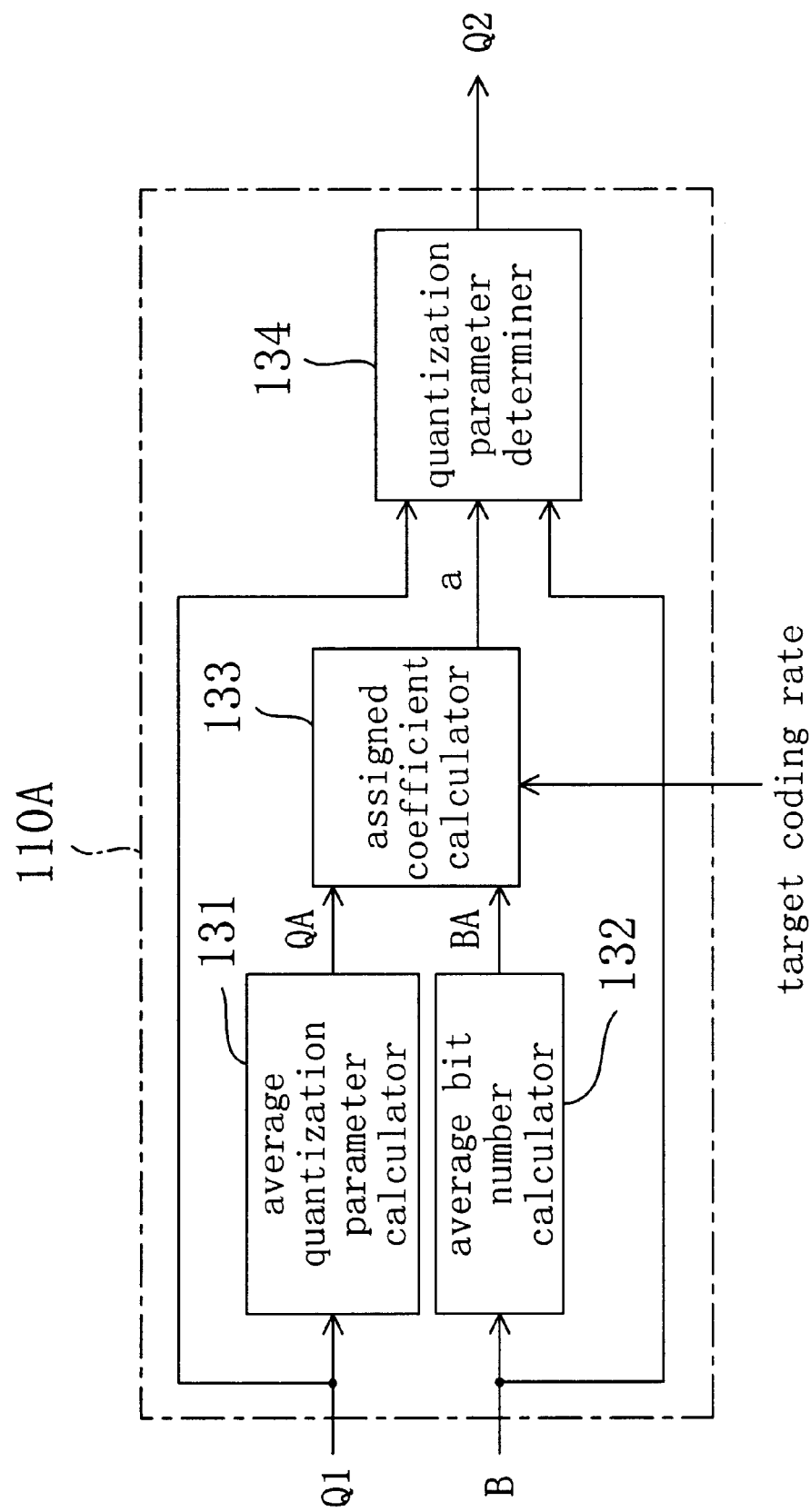
FIG. 3 is a block diagram illustrating an exemplary configuration for a scene parameter determiner.

FIG. 3 illustrates another exemplary configuration for the scene parameter determiner. As shown in FIG. 3, the scene parameter determiner 110A obtains the assigned coefficient a based on the quantization parameter Q1 and the number of bits generated B.

The memory 112 stores thereon the quantization parameters, and outputs the quantization parameter Q1 that was stored thereon a predetermined time ago (e.g., one GOP ahead). An average quantization parameter calculator 131 calculates and outputs an average QA of quantization parameters during a predetermined interval T. An average bit number calculator 132 calculates and outputs an average number of bits generated BA during the predetermined interval T. The interval T may be one minute, for example.

An assigned coefficient calculator 133 calculates the assigned coefficient a based on the average quantization parameter QA and the average number of bits BA in the following manner.

As described above, a quantization parameter realizing an optimum bit assignment can be defined at an intersection between a curve b=X/q representing a relationship between the number of bits generated b and the quantization parameter q, and a line with an inclination equal to the assigned coefficient a. That is to say, the following relationships are met:

$b=a \times q$ $a=b/q$

Accordingly, based on the average QA of quantization parameters previously used and the average number of bits BA previously generated, the assigned coefficient calculator 133 obtains the assigned coefficient a by $a=BA/QA$ Also, the assigned coefficient a may be calculated using a target number of bits BT corresponding to a target coding rate as well. The product of an average quantization parameter QA and an average number of bits BA is obtained as an average complexity XA during the interval T. That is to say, $XA=BA \times QA$ A quantization parameter QT, which is associated with an average number of bits BA equal to the target number of bits BT, can be obtained based on the average complexity XA $QT=XA/BT$ The target number of bits BT, quantization parameter QT and assigned coefficient a have the following relationship $BT=a \times QT=a \times XA/BT$ Accordingly, the assigned coefficient a is given by $$a = BT \times BT/XA = BT \times BT/(BA \times QA)$$

By additionally using the target coding rate in calculating the assigned coefficient a, the actual coding rate can be even closer to the target coding rate.

A quantization parameter determiner 134 receives the assigned coefficient a, the quantization parameter Q1 that was stored a predetermined time ago, and the number of bits B that was calculated a predetermined time ago. Based on these values, the determiner 134 calculates and outputs the second quantization parameter Q2 as the quantization parameter determiner 121 shown in FIG. 1 does. By utilizing such a configuration, a quantization parameter Q2 can be obtained adaptively to an individual scene.

(Determination of Quantization Parameter for Controlling Average Coding Rate)

Figure 23:
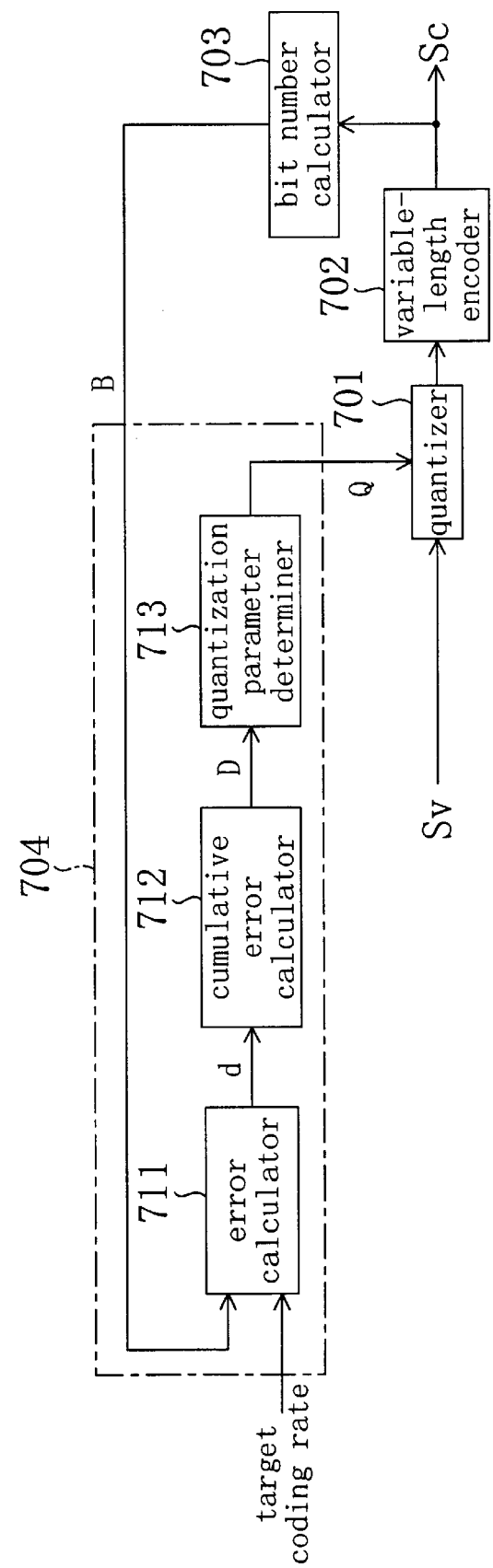
FIG. 23 is a block diagram illustrating a configuration for a conventional coder.

The rate-controlling-parameter determiner 111 may have a similar configuration to that of the conventional rate-controlling-parameter determiner 704 shown in FIG. 23. In this case, the quantization parameter Q3 is fed back and controlled such that the cumulative error D becomes zero.

Figure 4:
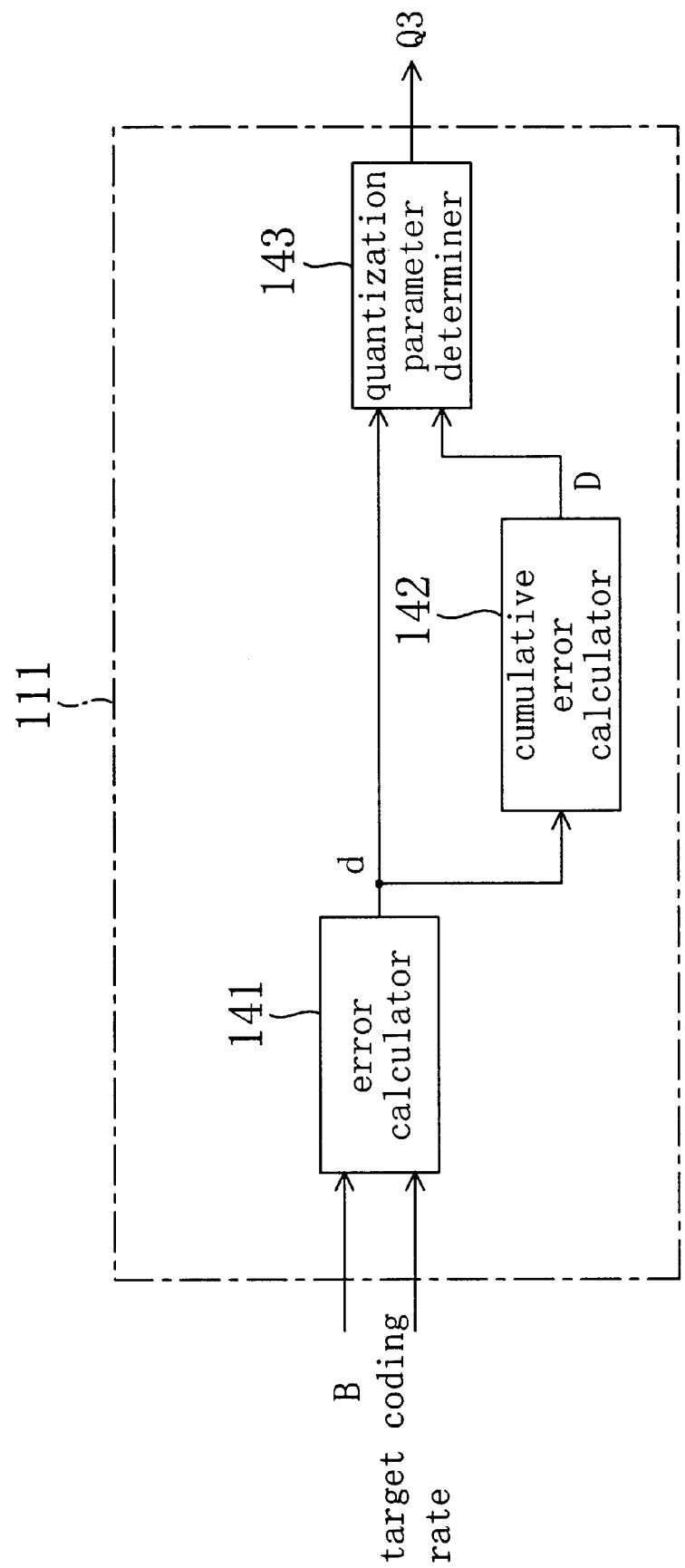
FIG. 4 is a block diagram illustrating an exemplary configuration for a rate-controlling-parameter determiner.

FIG. 4 illustrates another exemplary configuration for the rate-controlling-parameter determiner. The configuration shown in FIG. 4 is different from the conventional configuration shown in FIG. 23 in that a quantization parameter determiner 143 uses not only the cumulative error D but also an error d in determining the quantization parameter Q3.

An error calculator 141 calculates and outputs an error d (=B−BT) obtained by subtracting a target number of bits BT during the predetermined interval, which is derived from a target coding rate, from the number of bits generated B. A cumulative error calculator 142 accumulates the errors d and outputs the cumulative error D. A quantization parameter determiner 143 determines the quantization parameter Q3 based on the error d and the cumulative error D.

In the conventional configuration, the quantization parameter is fed back and controlled in accordance with the cumulative error D such that the quantization parameter increases proportionally to the cumulative error D. In coding an image with a low complexity of coding, the coding rate is ordinarily smaller than a target coding rate. If the cumulative error D is large, then the quantization parameter is controlled to further increase such that the coding rate further decreases. However, if the quantization parameter is increased for an image with a low complexity of coding, then image quality deteriorates more seriously than an image with a high complexity of coding, although the decrease in coding rate of the former image is smaller than that of the latter.

Thus, in the configuration shown in FIG. 4, the characteristic of the feedback control of the quantization parameter Q3 based on the cumulative error D is modified depending on the magnitude of the error d obtained by the error calculator 141. As a result, the average rate can be controlled in accordance with individual scenes.

For example, if the error d is negative (i.e., if the image has a low complexity of coding), then the feedback quantity is decreased and the variation in quantization parameter is reduced, thereby suppressing the variation in image quality. In particular, the increase in quantization parameter is suppressed to suppress the deterioration in image quality. On the other hand, if the error d is positive, then the quantization parameter may be determined using the cumulative error D as a feedback quantity as in the conventional method.

By regulating the characteristic of the feedback control in controlling an average rate in accordance with the complexity of coding a particular scene, a number of bits can be controlled at a value best adapted to the scene. Also, according to the conventional feedback control, oscillation may be caused in the number of bits generated and the quantization parameter. In contrast, the configuration shown in FIG. 4 can also suppress the oscillation of these values.

In the foregoing example, the feedback quantity is supposed to be changed in accordance with the magnitude of the error. Alternatively, any other method of regulating the feedback control characteristic with the cumulative error may be used instead. For example, a time constant may also be changed for that purpose.

Figure 5:
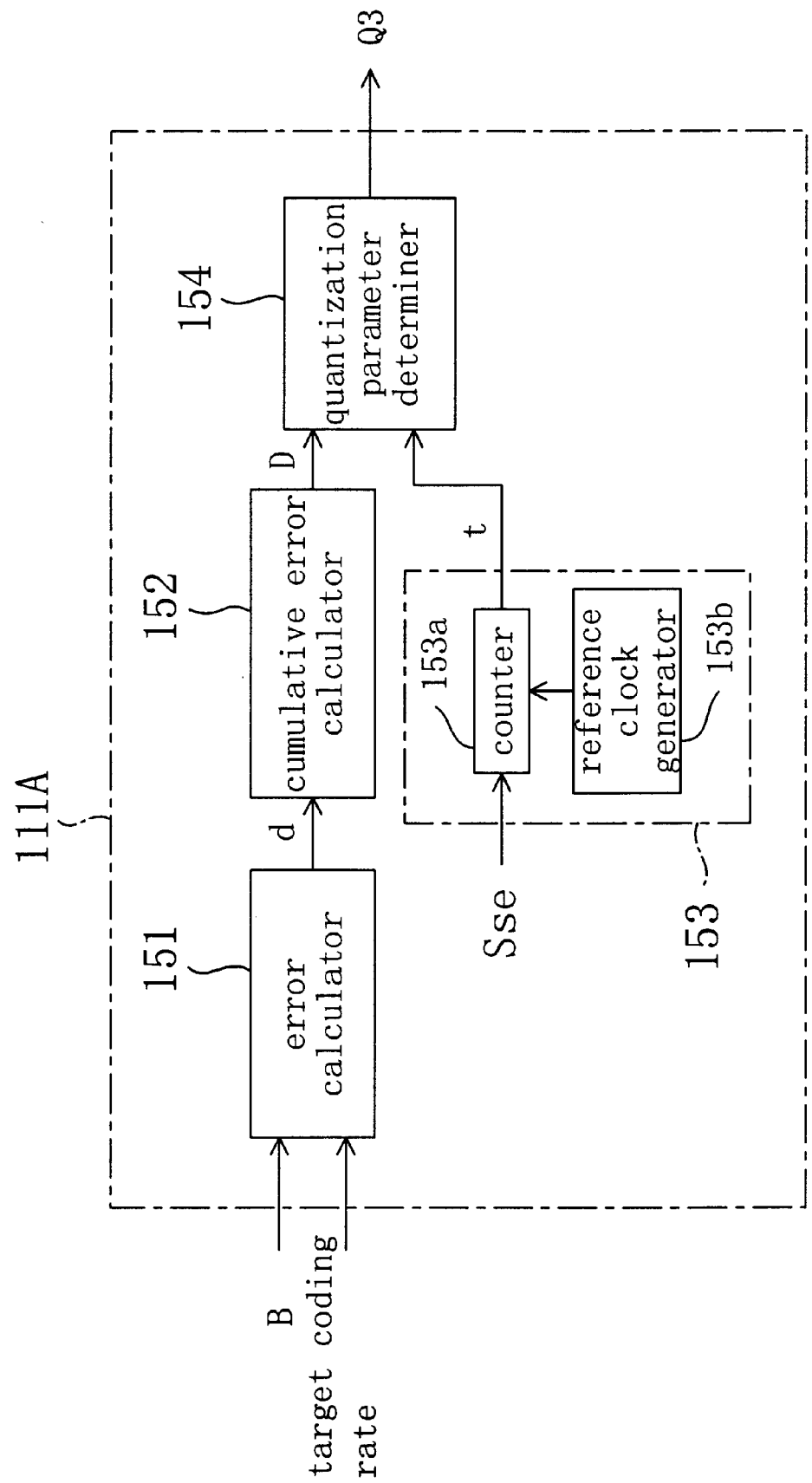
FIG. 5 is a block diagram illustrating another exemplary configuration for the rate-controlling-parameter determiner.

FIG. 5 illustrates another exemplary configuration for the rate-controlling-parameter determiner. The configuration shown in FIG. 5 is different from the conventional configuration shown in FIG. 23 in that a quantization parameter determiner 154 uses not only the cumulative error D but also a coding time t in determining the quantization parameter Q3.

An error calculator 151 calculates and outputs an error d (=B−BT) obtained by subtracting a target number of bits BT for the predetermined interval, which is derived from a target coding rate, from the number of bits generated B. A cumulative error calculator 152 accumulates the errors d and outputs the cumulative error D. A coding time clock 153 clocks and outputs a passed time t, during which the input video signal has been coded. A quantization parameter determiner 154 determines the quantization parameter Q3 based on the passed time t and the cumulative error D.

In the coding time clock 153, a counter 153a receives a coding start/end instruction signal Sse, which has been supplied as a control signal to the coder. When the start of coding is instructed by the coding start/end instruction signal Sse, the counter 153a resets the count at zero, and then counts the clock pulses supplied from a reference clock generator 153b, thereby clocking the time t passed since the start of coding.

As in the conventional configuration shown in FIG. 23, the quantization parameter determiner 154 performs a feedback control using the cumulative error D as a feedback quantity and the time constant T. However, unlike the conventional configuration, the determiner 154 changes the time constant T as the time t passes. Specifically, the determiner 154 sets the time constant T smaller as the passed time t is mounting.

Figure 6:
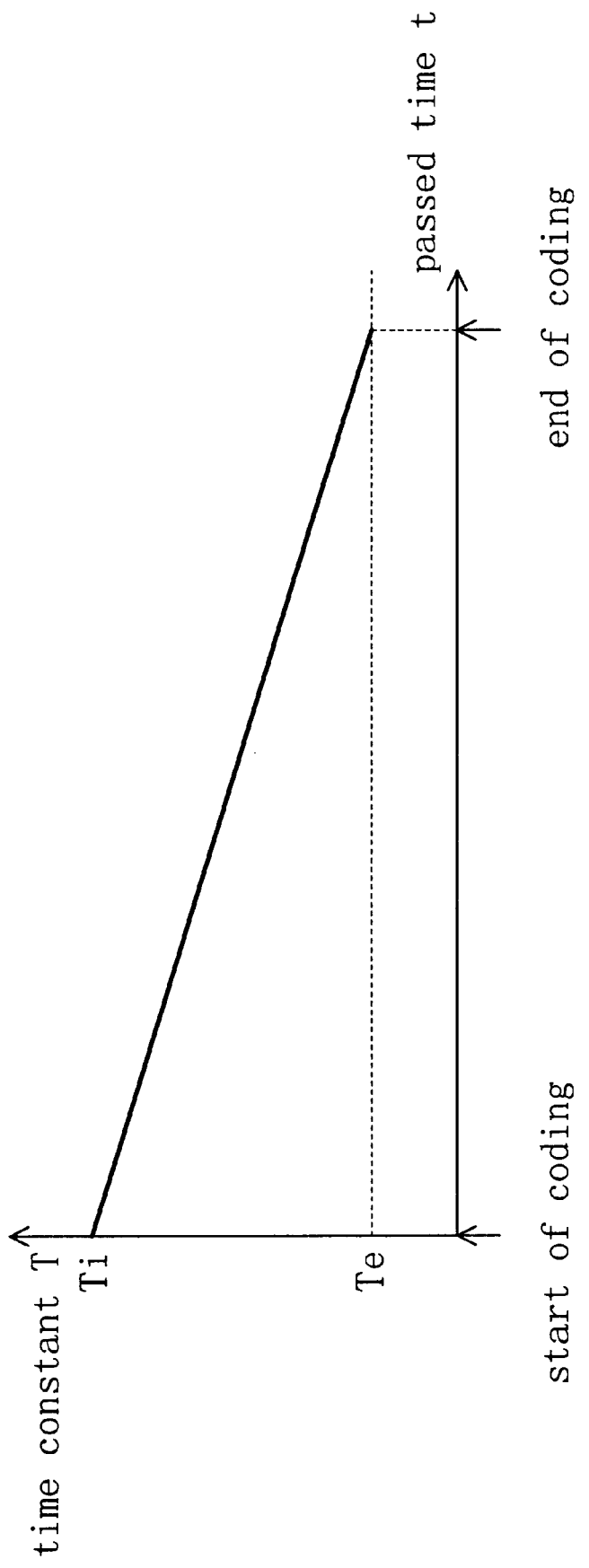
FIG. 6 illustrates how the time constant changes with time during a feedback control performed by the rate-controlling-parameter determiner shown in FIG. 5.

FIG. 6 illustrates how the time constant T changes with time. As shown in FIG. 6, the time constant T is initialized at Ti when coding is started. As the time t passes, the time constant T is gradually decreased. And at the end of coding, the time constant T is set equal to the predetermined time constant Te.

For example, if a video signal with duration of one hour is coded, the time constant T may be set in the following manner. At the start of coding, the time constant T is set at such a value that the cumulative error D will reach zero in 15 minutes. Thereafter, at a point in time the video signal has been coded for 30 minutes, the time constant T is changed to such a value that the cumulative error D will reach zero in 5 minutes. And when only 5 minutes is left to finish coding the video signal, the time constant T is changed again to such a value that the cumulative error D will reach zero in just 1 minute.

By changing the time constant T along with the progress of coding in this manner, the feedback control may be performed gently at the start of coding to increase the flexibility of the variable coding rate. As a result, coding may be performed at a rate, which is better suited to a particular scene. Thereafter, if the feedback control is enhanced along with the progress of coding processing, then an average coding rate comes even closer to a target coding rate. Accordingly, a resultant error between the average and target coding rates can be reduced at the end of coding processing.

It should be noted that the quantization parameter Q3 may be determined using not only the cumulative error D and the coding time t, but also the error d as in the configuration shown in FIG. 4. Specifically, the feedback control characteristic of the cumulative error D may be modified using the error d, and the time constant T for the feedback control may be changed with the passage of the coding time t. In this manner, the average coding rate can be controlled even more adaptively to an individual scene.

In the foregoing example, the time constant T for the feedback control is supposed to be changed with the coding time t. Alternatively, any other method of modifying the feedback control characteristic may be employed instead. For example, the feedback quantity may be changed for that purpose.

The rate-controlling-parameter determiner shown in FIG. 4 or 5 may be used by itself in place of the conventional rate-controlling-parameter determiner. Also, another rate-controlling-parameter determiner for determining the quantization parameter using the coding time, cumulative error and error (i.e., a combination of the determiners shown in FIGS. 4 and 5) may also be used by itself.

(Scene Change Detection)

A change of scenes may be detected by spotting a large variation in a parameter characterizing each frame of the input video signal Sv. Specifically, the scene change detector 114 may detect a variation in some signal level such as a luminance or chromativity level of an image. For example, a change of scenes may be detected using a variation in average luminance level or an inter-frame (or inter-field) difference.

Also, a change of scenes may be detected based on a level variation between frames.

There is a large level variation between a pair of frames before and after the scenes are changed. Thus, if a level difference between frames turns out to be a predetermined value or more, then it can be determined that the scenes have been changed. However, a scene with a lot of motion also has a large inter-frame difference. Accordingly, if the change of scenes is detected based on the inter-frame level difference only, then such a scene with a lot of motion may be detected erroneously as a change of scenes.

Thus, it is imaginable to detect a change of scenes by calculating a variation in inter-frame difference.

Figure 7:
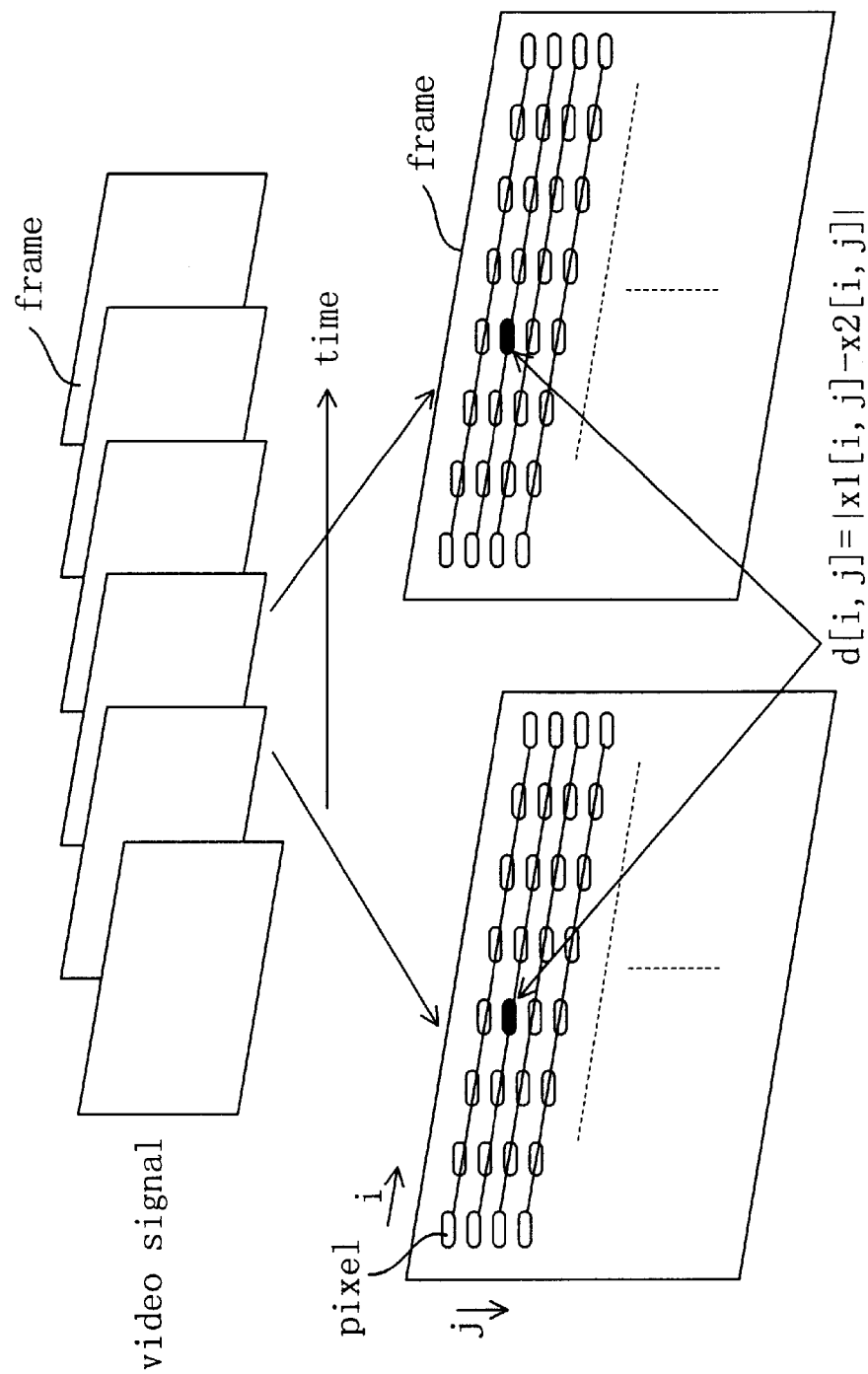
FIG. 7 illustrates how an inter-frame difference is estimated to detect a scene change.

FIG. 7 illustrates how an inter-frame difference is calculated. In FIG. 7, an image signal is represented as a series of frames appearing one after another. Also, each frame is composed of a plurality of pixels, which are minimum units of the image signal. As shown in FIG. 7, an inter-frame difference is a sum or average of absolute differences d[i, j], each representing a difference between the level x1[i, j] of a pixel at a location [i, j] within a current frame and the level x2[i, j] of an associated pixel at the same location within a previous frame.

Figure 8:
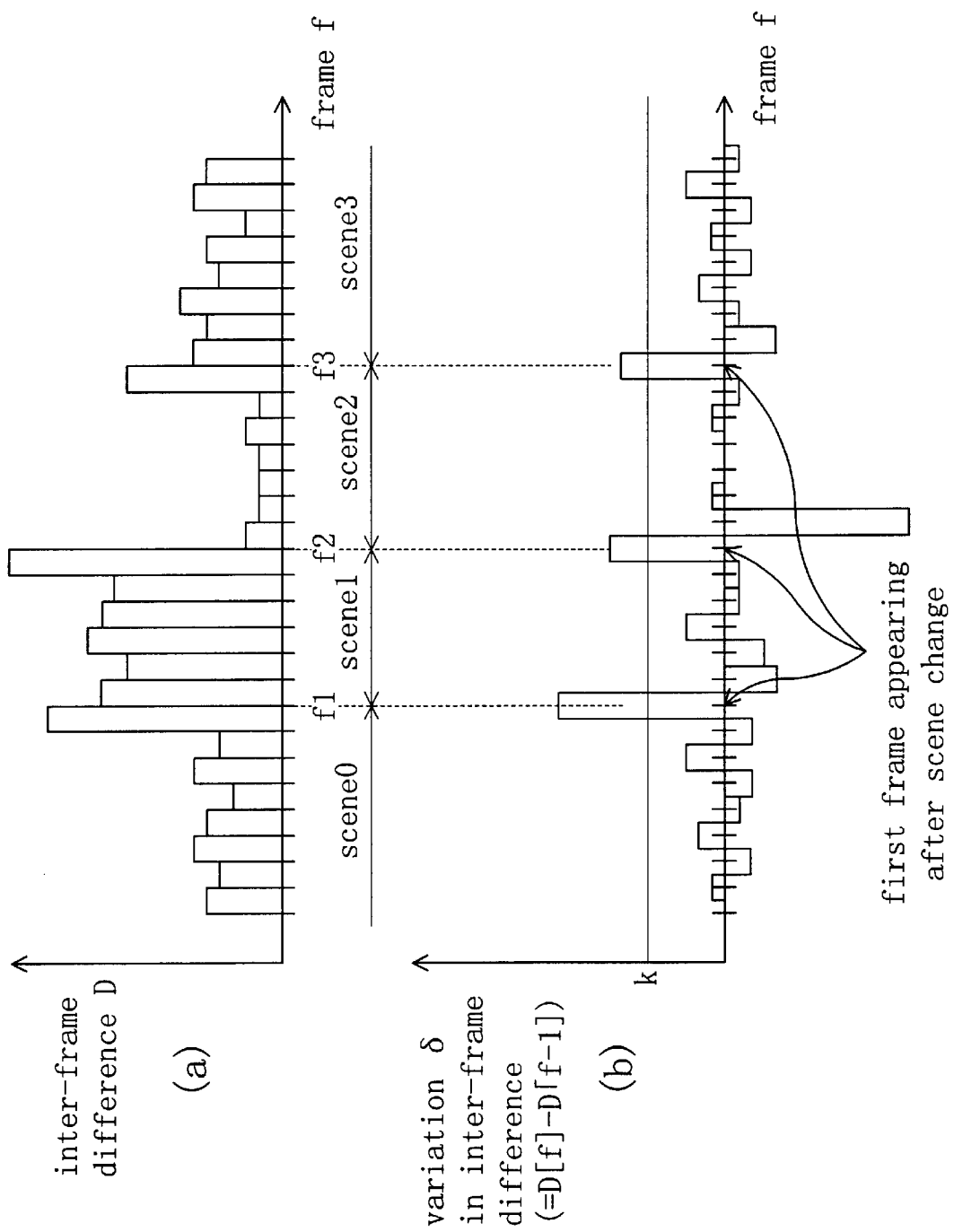
FIG. 8A illustrates how the inter-frame difference changes with time in an image signal.
FIG. 8B illustrates how the variation in inter-frame difference changes with time.

FIG. 8A illustrates how the inter-frame difference D changes with time in an image signal. In example illustrated in FIG. 8A, the image signal is composed of Scenes 0 through 3, the scenes are changes at respective frames f1, f2, f3 and Scene 1 shows a lot of motion.

As shown in FIG. 8A, the inter-frame differences D are large at the scene change frames f1, f2 and f3. However, even in Scene 1 with a lot of motion, the inter-frame difference D is also large and at almost the same level as that of the scene change frame f3. Accordingly, if the occurrence of scene change is determined only by the inter-frame difference D, then the scene change may be detected erroneously.

FIG. 8B illustrates how the variation δ in inter-frame difference (i.e., a difference between the inter-frame difference D of a frame and that of the succeeding frame) changes with time. As shown in FIG. 8B, only when the scenes are changed, the variation δ in inter-frame difference is large enough to exceed a threshold value k. Accordingly, by comparing the variation δ in inter-frame difference to the threshold value k, the scene change can be detected accurately.

In this case, the scene change detection processing includes the following steps of:

(1) calculating an absolute difference d[i, j] between a pixel level x1[i, j] within an $f^{th}$ frame and a pixel level x2[i, j] within an $(f-1)^{th}$ frame;

$$d[i, j]=x1[i, j]-x2[i, j]$$

(2) accumulating the level differences d[i, j], thereby calculating an inter-frame difference D[f];

$$D[f]=\Sigma d[i, j]$$

(3) calculating the variation δ[f] in inter-frame difference D[f];

$$\delta[f]=D[f]-D[f-1]$$

(4) comparing the variation δ[f] in inter-frame difference to the predetermined value k; and (5) if δ[f]>k, determining the $f^{th}$ frame as the first frame appearing after the scenes have been changed.

Figure 9:
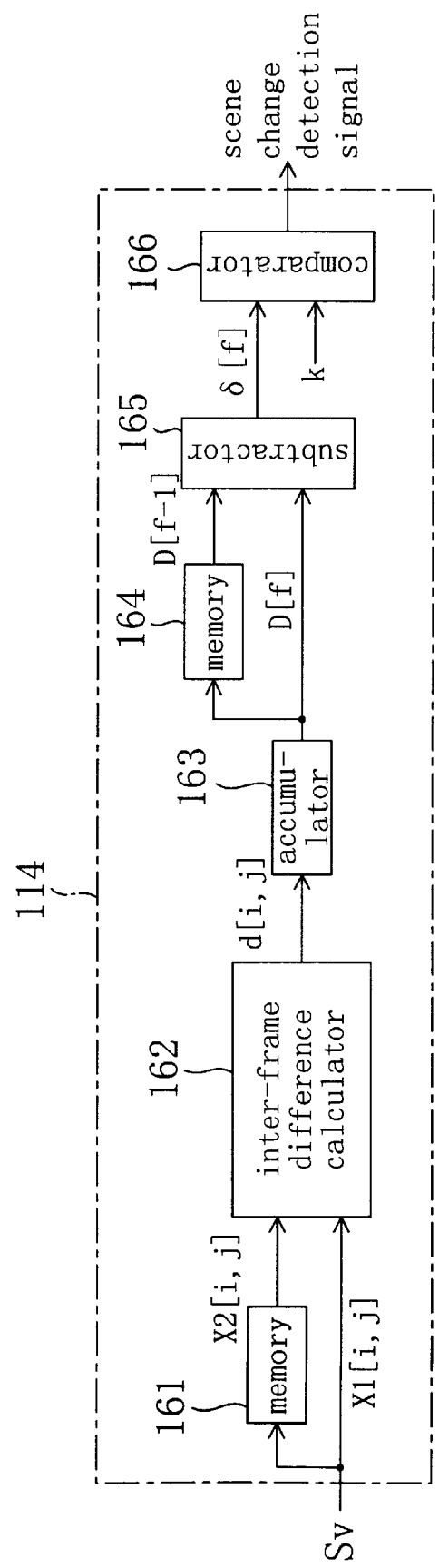
FIG. 9 is a block diagram illustrating a first exemplary configuration for a scene change detector.

FIG. 9 illustrates a first exemplary configuration for the scene change detector. In FIG. 9, a memory 161 stores thereon the input video signal Sv and outputs the signal after delaying it for just one frame interval. An inter-frame difference calculator 162 calculates an absolute difference d[i, j] between a pixel level x1[i, j] within an $f^{th}$ frame of the input video signal Sv and a pixel level x2[i, j] within an $(f-1)^{th}$ frame output from the memory 162. An accumulator 163 accumulates the absolute differences d[i, j] for one frame and outputs the accumulation as an inter-frame difference D[f]. A memory 164 stores thereon the inter-frame difference D[f] supplied from the accumulator 163 and outputs the difference D[f] after delaying it for just one frame interval.

A subtractor 165 subtracts the inter-frame difference D[f−1], which has been supplied from the memory 164, from the inter-frame difference D[f], which has been supplied from the accumulator 163, thereby obtaining and outputting a variation δ[f] in inter-frame difference. A comparator 166 compares the variation δ[f] in inter-frame difference to the predetermined value k, thereby outputting a scene change detection signal. Specifically, if the variation δ[f] in inter-frame difference is larger than the predetermined value k, then it is determined that the scenes have been changed between the $(f-1)^{th}$ and $f^{th}$ frames.

For example, if pixels are represented at 256 levels and the inter-frame difference D[f] is an average per pixel, then the predetermined value k may be defined at the $18^{th}$ level.

In the foregoing example, the video signal is supposed to be processed on a frame basis. Alternatively, the signal may be processed on a field basis. Also, the scene change is supposed to be detected from the input video signal Sv. Optionally, scene change information may be externally supplied to the scene change detector 114. Furthermore, a variation in any other signal related to the video signal, e.g., an audio signal, may be detected.

Moreover, the scene change may also be detected by estimating the complexity of coding. For example, the scene change may be detected in accordance with a variation in number of bits of coded data on the basis of a frame or a GOP (in coding according to the MPEG-2 standard).

In general, the complexity of coding differs depending on the type of the scene in question. That is to say, a scene difficult to code, e.g., a scene with a lot of motion or a lot of complex patterns, has generated a large number of bits to be coded. In contrast, a scene easy to code, e.g., a scene with little motion or a lot of flat patterns, has generated a small number of bits to be coded. Thus, it is also possible to detect a scene change based on a variation in number of bits generated.

Figure 10:
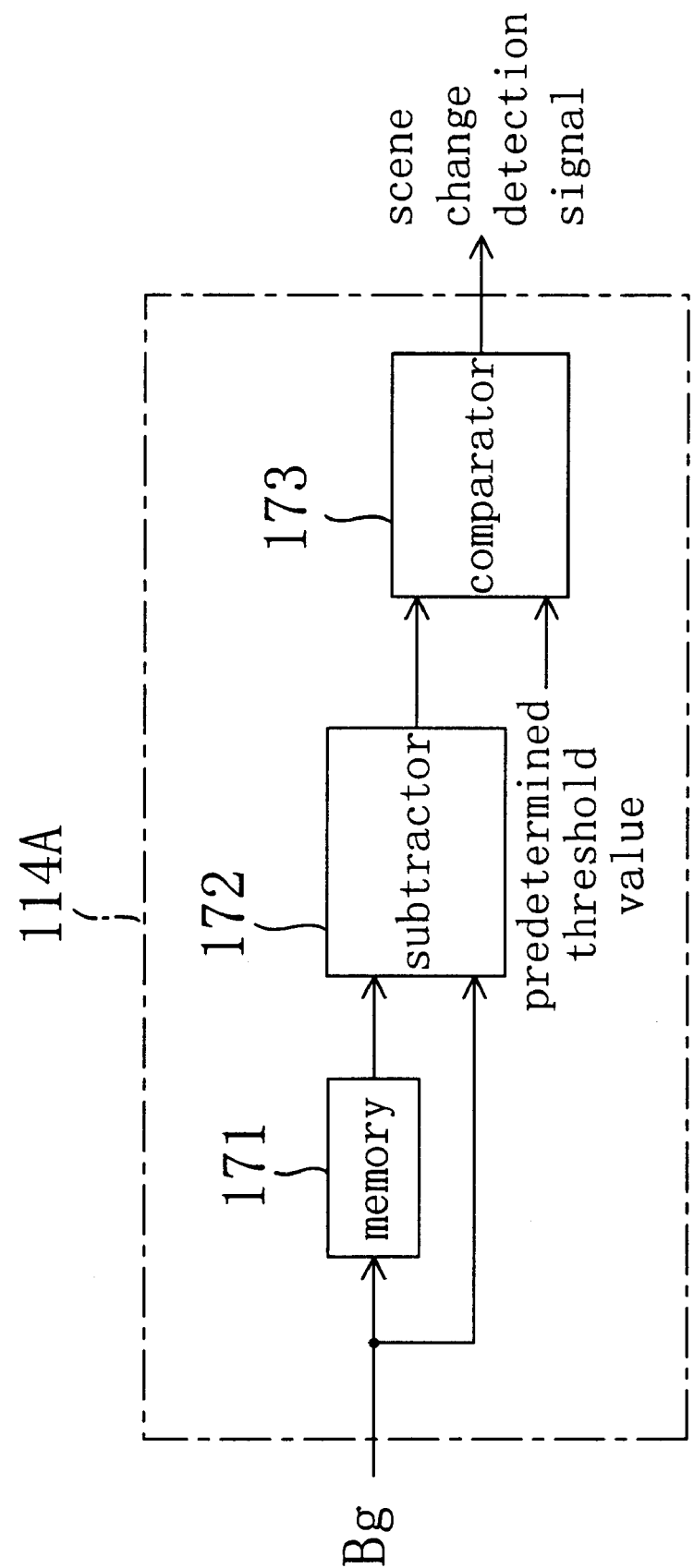
FIG. 10 is a block diagram illustrating a second exemplary configuration for the scene change detector.

FIG. 10 illustrates a second exemplary configuration for the scene change detector. In FIG. 10, the scene change detector 114A is supposed to receive a number of bits Bg, which have been generated during a period of time corresponding to one GOP interval (hereinafter, simply referred to as a "GOP bit number"), from the bit number calculator 103 on a frame-to-frame basis. In the illustrated example, Bg[i] denotes a GOP bit number calculated at an $i^{th}$ frame.

A memory 171 stores thereon the GOP bit number Bg[i] and outputs it after delaying it for just one frame interval. A subtractor 172 calculates an absolute difference between the GOP bit number Bg[i] supplied and a GOP bit number Bg[i−1] of the previous frame, which has been supplied from the memory 171, as a variation ΔBg in number of bits between these frames.

$$\Delta Bg=|Bg[i]-Bg[i-1]|$$

A comparator 173 compares the variation ΔBg in number of bits between the frames to a predetermined threshold value. Specifically, if the variation ΔBg is larger than the threshold value, then the comparator 173 determines that the scenes have been changed between these frames and outputs a scene change detection signal.

Next, it will be described how to calculate the GOP bit number Bg[i]. According to the MPEG coding technique, a number of bits generated in each frame greatly differs depending on the type of a picture in question, namely, I-, P- or B- picture. Thus, it is more preferable to calculate a number of bits on a GOP basis and use it as an index characterizing an individual scene. However, since the GOP bit number should be calculated every GOP interval, it is difficult to characterize each scene on a frame-by-frame basis.

Thus, a GOP bit number Bg is calculated using the following conversion equation:

$$Bg=Bi+Np\times Bp+Nb\times Bb$$

where Bi, Bp and Bb are respective numbers of bits of the latest I-, P- and B-frames, and Np and Nb are respective numbers of P-frames and B-frames included in the GOP. By using this conversion equation, the GOP bit number Bg can be calculated as a bit number characterizing each scene on a frame basis.

Also, a product of the number of bits generated B of the coded data and the quantization parameter Q used for the quantization processing, i.e., complexity X (=B×Q), may be obtained and the scene change may be detected based on a variation in this complexity X. The complexity X is substantially constant irrespective of the quantization parameter Q and is used as a parameter representing a difficulty in coding. That is to say, the more difficult to code a scene, the higher the complexity X.

Figure 11:
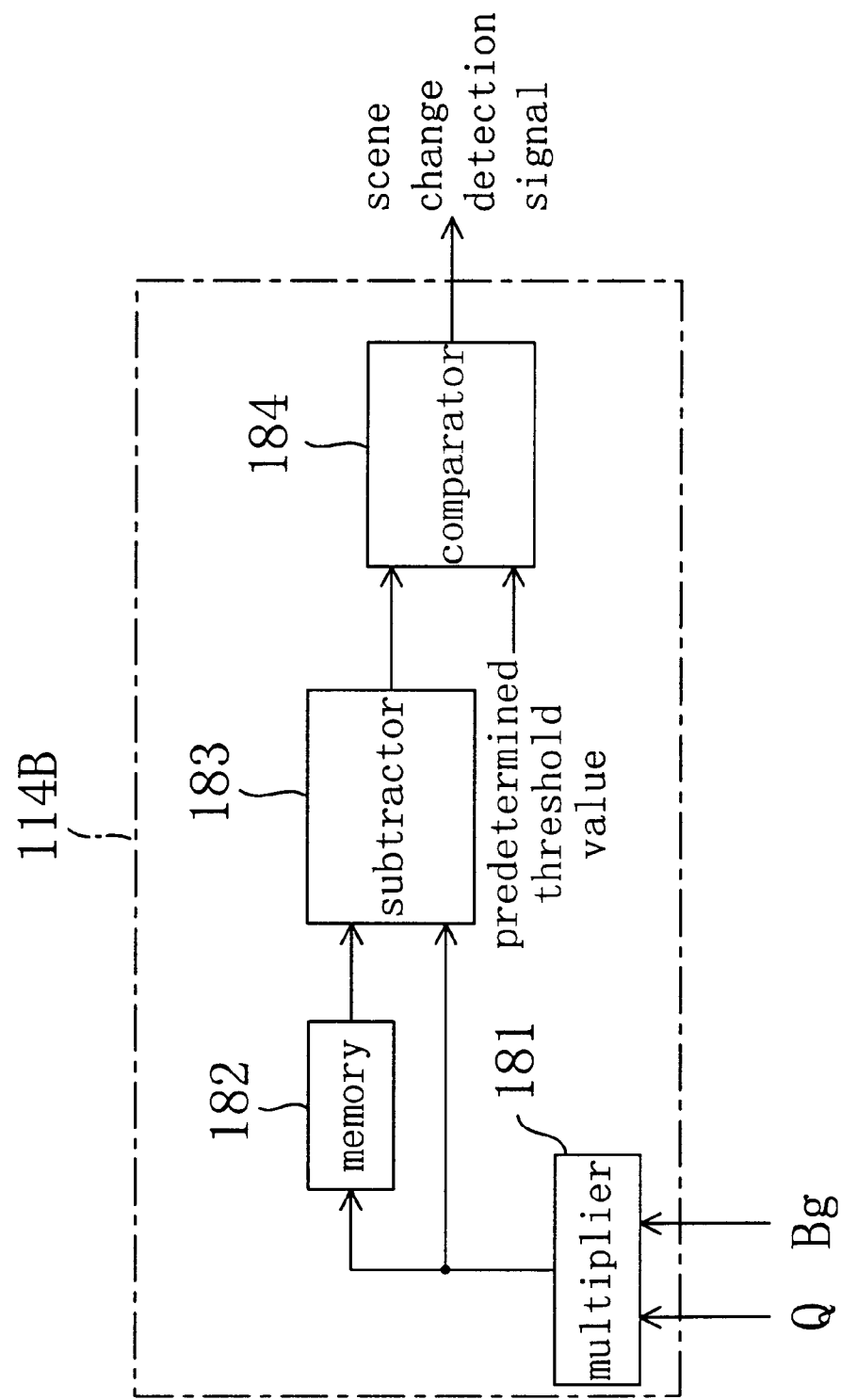
FIG. 11 is a block diagram illustrating a third exemplary configuration for the scene change detector.

FIG. 11 illustrates a third exemplary configuration for the scene change detector, which is modified to detect a scene change based on a variation in complexity. The scene change detector 114B is almost the same as the scene change detector 114A shown in FIG. 10, but is different from the detector 114A in that the detector 114B further includes a multiplier 181 and that the complexity is calculated to detect a scene change.

The multiplier 181 multiplies together the GOP bit number Bg calculated by the bit number calculator 103 and the quantization parameter Q used by the quantizer 101, and outputs the product as the complexity X. In this example, Xg[i] is a complexity measured at the $i^{th}$ frame.

$$Xg[i]=Bg[i]\times Q[i]$$

A memory 182 stores thereon the complexity Xg[i] supplied from the multiplier 181 and outputs it after delaying it for just one frame interval. A subtractor 183 calculates an absolute difference between the complexity Xg[i] supplied from the multiplier 181 and the complexity Xg[i−1] of the previous frame supplied from the memory 182 as a variation ΔXg in complexity between these frames.

$$\Delta Xg=|Xg[i]-Xg[i-1]|$$

A comparator 184 compares the variation ΔXg in complexity to a predetermined threshold value. Specifically, if the variation ΔXg is larger than the threshold value, then the comparator 184 determines that the scenes have been changed between these frames and outputs a scene change detection signal.

It should be noted that the scene change detector 114 may be formed by combining the respective configurations shown in FIGS. 9, 10 and 11 in an arbitrary manner. In such a case, it can be determined that the scenes have been changed when the scene change detection signal is output from one of these configurations combined or all of these configurations at a time.

EMBODIMENT 2

Figure 12:
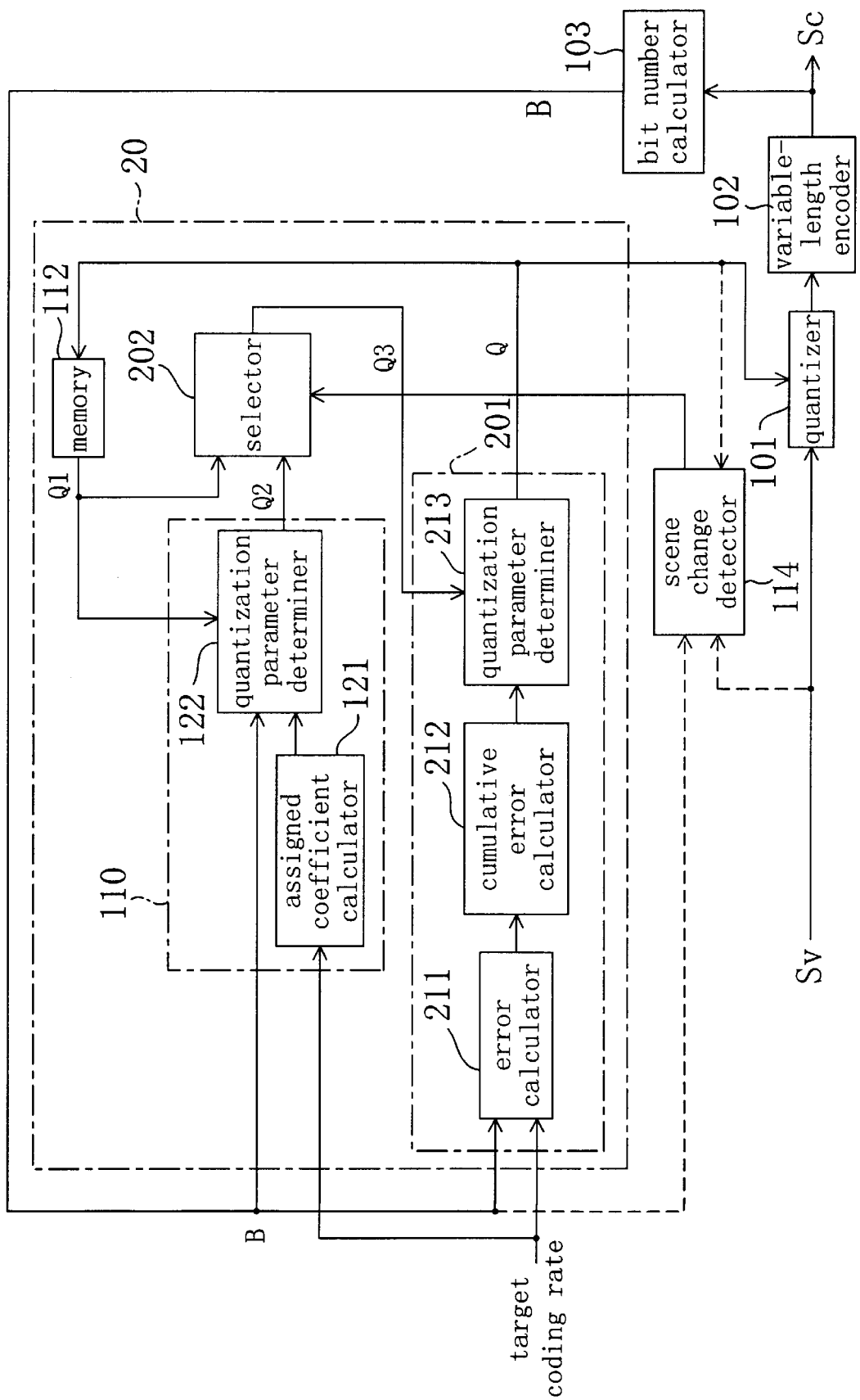
FIG. 12 is a block diagram illustrating a configuration for a coder according to a second embodiment of the present invention.

FIG. 12 is a block diagram illustrating a configuration for a coder according to a second embodiment of the present invention. In FIG. 12, the same components as those illustrated in FIG. 1 are identified by the same reference numerals. The coder shown in FIG. 12 is different from the coder shown in FIG. 1 in the following respects. Specifically, a selector 202 selectively outputs, as a quantization parameter Q3, either the quantization parameter Q1 output from the memory 112 or the quantization parameter Q2 output from the scene parameter determiner 110. Responsive to the quantization parameter Q3 output from the selector 202, a rate-controlling-parameter determiner 201 determines and outputs a quantization parameter Q used for quantization processing such that an average coding rate during a predetermined interval is as close to a target coding rate as possible. The scene parameter determiner 110, memory 112, rate-controlling-parameter determiner 201 and selector 202 together constitute quantization parameter supplying means 20 as defined in the appended claims.

The selector 202 usually selectively outputs the first quantization parameter Q1, which is the output of the memory 112, as the quantization parameter Q. However, if the scene change detector 114 has detected a scene change, then the selector 202 selectively outputs the second quantization parameter Q2, which is the output of the scene parameter determiner 110, as the quantization parameter Q.

The rate-controlling-parameter determiner 201 includes an error calculator 211, a cumulative error calculator 212 and a quantization parameter determiner 213. Responsive to the quantization parameter Q3 output from the selector 202, the determiner 201 determines and outputs a quantization parameter Q such that an average coding rate during a predetermined interval is as close to a target coding rate as possible.

The quantization parameter Q may be calculated by:

$$Q=Q3/(1-D/T)$$

where D is a cumulative error, which is an accumulation of errors between a target number of bits, associated with a target coding rate, and a number of bits actually generated. That is to say, the feedback control is carried out to reduce the cumulative error to zero. Also, T is a time constant used for the feedback control. The feedback control is carried out to reduce the cumulative error to zero during the interval T.

In the configuration shown in FIG. 12, the average coding rate can be controlled to come as close to the target coding rate as possible by feeding back the quantization parameter, which was defined a predetermined time ago, within the same scene. And if scenes have been changed, the average rate can be controlled based on an appropriate quantization parameter, which is most closely associated with the complexity of coding the newly appearing scene. As a result, coding processing can be performed adaptively to the individual scenes, while controlling an average coding rate at the same time.

EMBODIMENT 3

Figure 13:
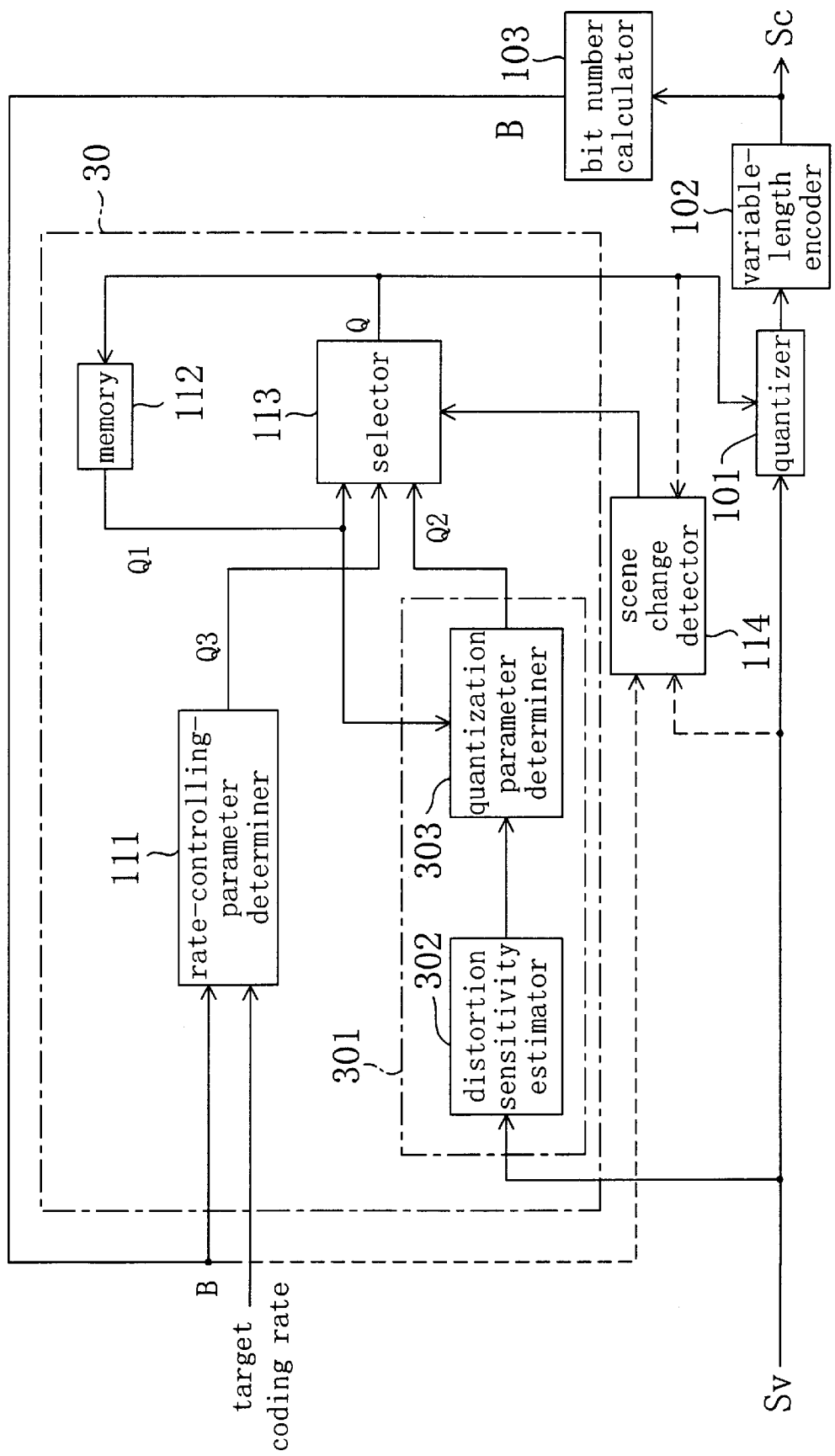
FIG. 13 is a block diagram illustrating a configuration for a coder according to a third embodiment of the present invention.

FIG. 13 is a block diagram illustrating a configuration for a coder according to a third embodiment of the present invention. In FIG. 13, the same components as those illustrated in FIG. 1 are identified by the same reference numerals. The coder shown in FIG. 13 is different from the coder shown in FIG. 1 in the following respects. Specifically, a scene parameter determiner 301 includes a distortion sensitivity estimator 302 and a quantization parameter determiner 303, and determines the second quantization parameter Q2 directly based on the input video signal Sv without using the number of bits generated B. The distortion sensitivity estimator 302 estimates the distortion of each scene that is sensed by the human eyes. The quantization parameter determiner 303 determines the quantization parameter Q2 based on the distortion sensitivity estimated by the distortion sensitivity estimator 302. The rate-controlling-parameter determiner 111, memory 112, selector 113 and scene parameter determiner 301 together constitute quantization parameter supplying means 30 as defined in the appended claims.

(Internal Configuration of Distortion Sensitivity Estimator)

The distortion sensitivity estimator 302 estimates and outputs the distortion of a video to be sensed by the human eyes during a predetermined interval with reference to the level of the input video signal Sv. The estimator 302 estimates the distortion sensed by the human eyes based on various values characterizing a video signal during a predetermined interval, e.g., average or variation of luminance or chromaticity levels and motion quantity of a pattern.

It is known that the higher a luminance level, the lower the distortion sensitivity. That is to say, the darker a picture, the more seriously the image quality of the picture, perceivable to the human eyes, is affected by noise generated. Accordingly, in a situation where a bright picture in a scene is changed into a dark picture in the next scene, the perceivable noise can be reduced if the quantization processing is performed using a quantization parameter smaller than that used for the bright picture. Conversely, if a dark picture is changed into a bright picture, the noise generated in the previous, dark picture is less likely to be perceived even if the quantization parameter is increased.

Figure 14:
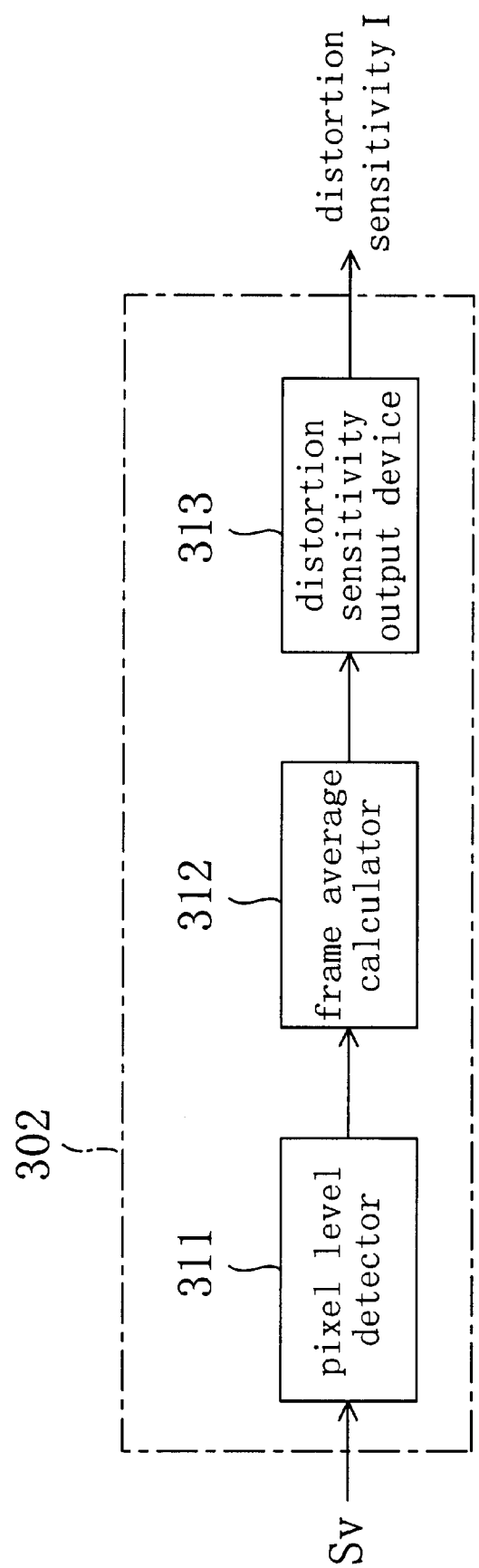
FIG. 14 is a block diagram illustrating an exemplary configuration for a distortion sensitivity estimator.

FIG. 14 illustrates an exemplary configuration for the distortion sensitivity estimator 302. The following relationship is met between the human sensation of brightness I and the luminance L:

$$I = k \cdot \log L + C$$

This is called "Weber-Fechner law". As far as everyday experience is concerned, a human being can perceive a variation ΔL in luminance L, the limit of which is approximated as:

$$\Delta L/L = \text{constant}$$

(see E. Watanabe et al., "Science of Vision", Shashin Kogyo Publisher K.K.)

Accordingly, an average of luminance levels of respective pixels within a frame may be estimated as brightness and the distortion sensitivity may be detected as a characteristic inversely proportional to the brightness estimated.

In FIG. 14, a pixel level detector 311 detects a pixel level, e.g., the luminance level of each pixel of the input video signal Sv. A frame average calculator 312 calculates a frame average of pixel levels detected by the pixel level detector 311 as the brightness L of the frame. Responsive to the brightness L obtained by the frame average calculator 312, a distortion sensitivity output device 313 calculates and outputs a distortion sensitivity I (=k3/L) using a predetermined value k3.

The quantization parameter determiner 303 controls the quantization parameter Q2 depending on the distortion sensitivity I estimated. Specifically, if the distortion sensitivity I is small, then the determiner 303 increases the quantization parameter Q2. Conversely, if the distortion sensitivity I is large, then the determiner 303 decreases the quantization parameter Q2. As a result, noise resulting from the quantization processing is less perceivable to the human eyes.

The pixel level detector 311 may also detect the chromaticity levels of respective pixels. This is because the human sensation of distortion is also variable depending on the chromaticity levels. For example, the human eyes are more sensitive to distortion of red components than that of blue components. Accordingly, if there are many red components within an overall frame, then the distortion thereof is more likely to be perceived by the human eyes. Thus, in such a case, the quantization parameter is controlled at a smaller value.

Figure 15:
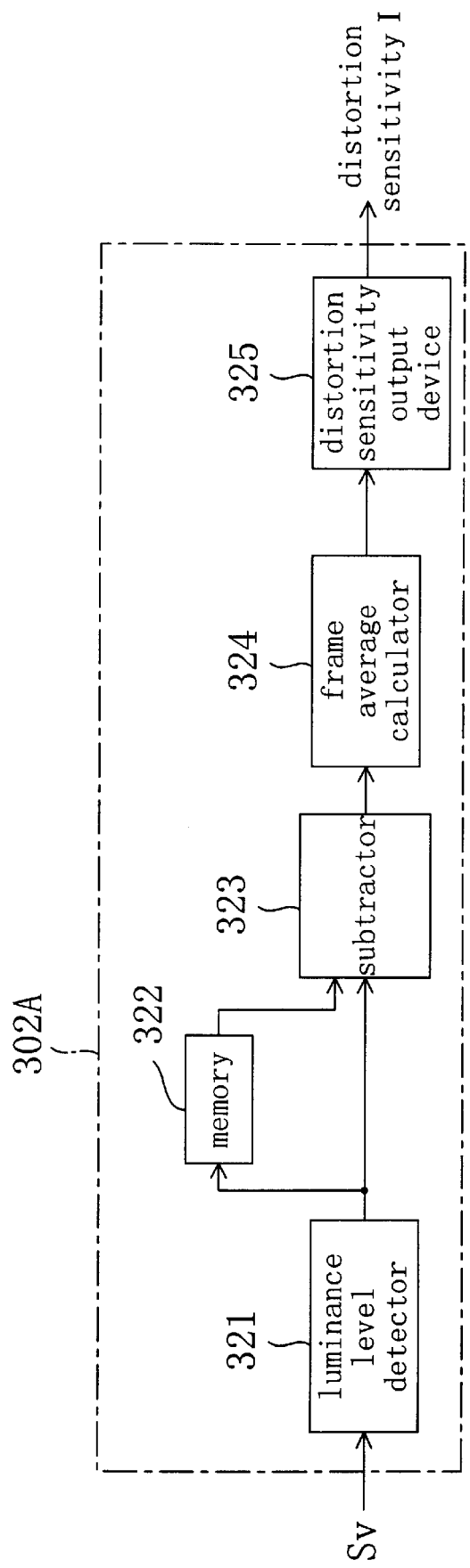
FIG. 15 is a block diagram illustrating another exemplary configuration for the distortion sensitivity estimator.

FIG. 15 illustrates another exemplary configuration for the distortion sensitivity estimator. The larger the level variation, the lower the distortion sensitivity. Accordingly, if the level variation is large, the coding noise is less perceivable to the human eyes even if the quantization parameter is increased. The distortion sensitivity estimator 302A shown in FIG. 15 is adapted to estimate the distortion sensitivity based on the level variation.

A luminance level detector 321 detects a pixel level, e.g., the luminance level of each pixel of the input video signal Sv. A memory 322 outputs the luminance level after delaying it for just one pixel interval. A subtractor 323 calculates an absolute difference between the luminance level of a current pixel and that of the previous pixel, which is output of the memory 322, as a differential level. A frame average calculator 324 calculates a frame average of differential levels and outputs it as a level variation. Responsive to the level variation, a distortion sensitivity output device 325 estimates and outputs a distortion sensitivity, which is inversely proportional to the level variation.

In the foregoing example, the memory 322 is supposed to delay the output of the luminance level for one pixel interval. Alternatively, the luminance level may be output after delaying it for one horizontal line interval. In such a case, the luminance level of a pixel, which is located one line above the current pixel, may be output. Also, the output of the luminance level may be delayed for a predetermined interval to output the luminance levels of pixels located around the current pixel.

Figure 16:
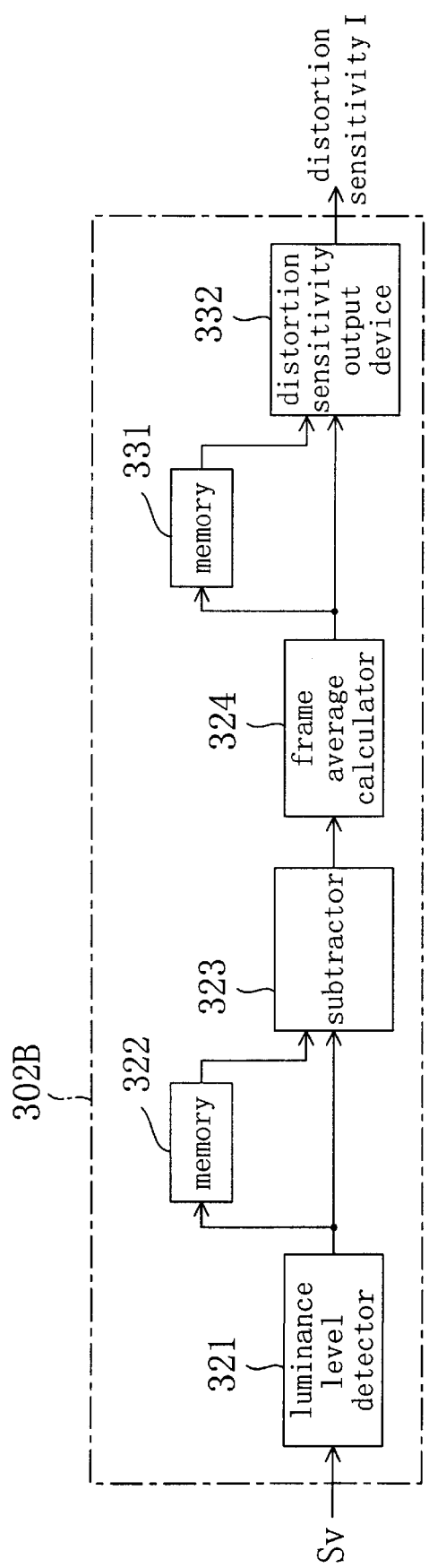
FIG. 16 is a block diagram illustrating still another exemplary configuration for the distortion sensitivity estimator.

FIG. 16 illustrates another exemplary configuration for the distortion sensitivity estimator for estimating the distortion sensitivity based on the level variation. The estimator 302B shown in FIG. 16 is substantially the same as the counterpart 302A shown in FIG. 15, but the estimator 302B further includes another memory 331. Accordingly, the distortion sensitivity output device 332 operates in a different manner. The memory 331 stores thereon the level variations and outputs a previous level variation, which is one frame ahead of the current frame. A distortion sensitivity output device 332 estimates the distortion sensitivity based on the level variation Vc of the current frame and the level variation Vp of the previous frame.

For example, suppose the previous frame is an image with a small level variation, where a lot of flat patterns are included, and the current frame is an image with a large level variation, where a lot of complex patterns are included. In such a situation, the human sensitivity decreases as to the distortion of the current frame. Thus, supposing the quantization parameter Qp was used in the previous frame, the quantization parameter Qc of the current frame is given by the following equations using a predetermined value k4, $$I=(k4 \cdot Vc+Vp)/(Vc+k4 \cdot Vp)$$

$$Qc=Qp \cdot I$$

For example, if k4=2.0, then the distortion sensitivity I is variable within a range from 0.5 to 2.0, including a situation where there is no level variation, i.e., I=1.0. In this manner, the quantization parameter may also be determined by estimating the distortion sensitivity based on a change of level variation between frames.

In the foregoing example, the memory 331 is supposed to output a previous level variation, which ahead of the current frame by one. Alternatively, if coding is performed according to the MPEG-2 coding technique, the level variation output may be that of a GOP ahead of the current GOP by one. In general, any unit may be used as long as the output of the level variation is delayed for a predetermined interval.

The same relationship is met between motion quantity and distortion sensitivity. That is to say, the distortion sensitivity changes with the motion quantity.

In this manner, by decreasing the quantization parameter for a scene with a high distortion sensitivity and increasing it for a scene with a low distortion sensitivity, the coding rate can be controlled to make the overall image quality more uniform and the number of bits generated can be suppressed.

EMBODIMENT 4

Figure 17:
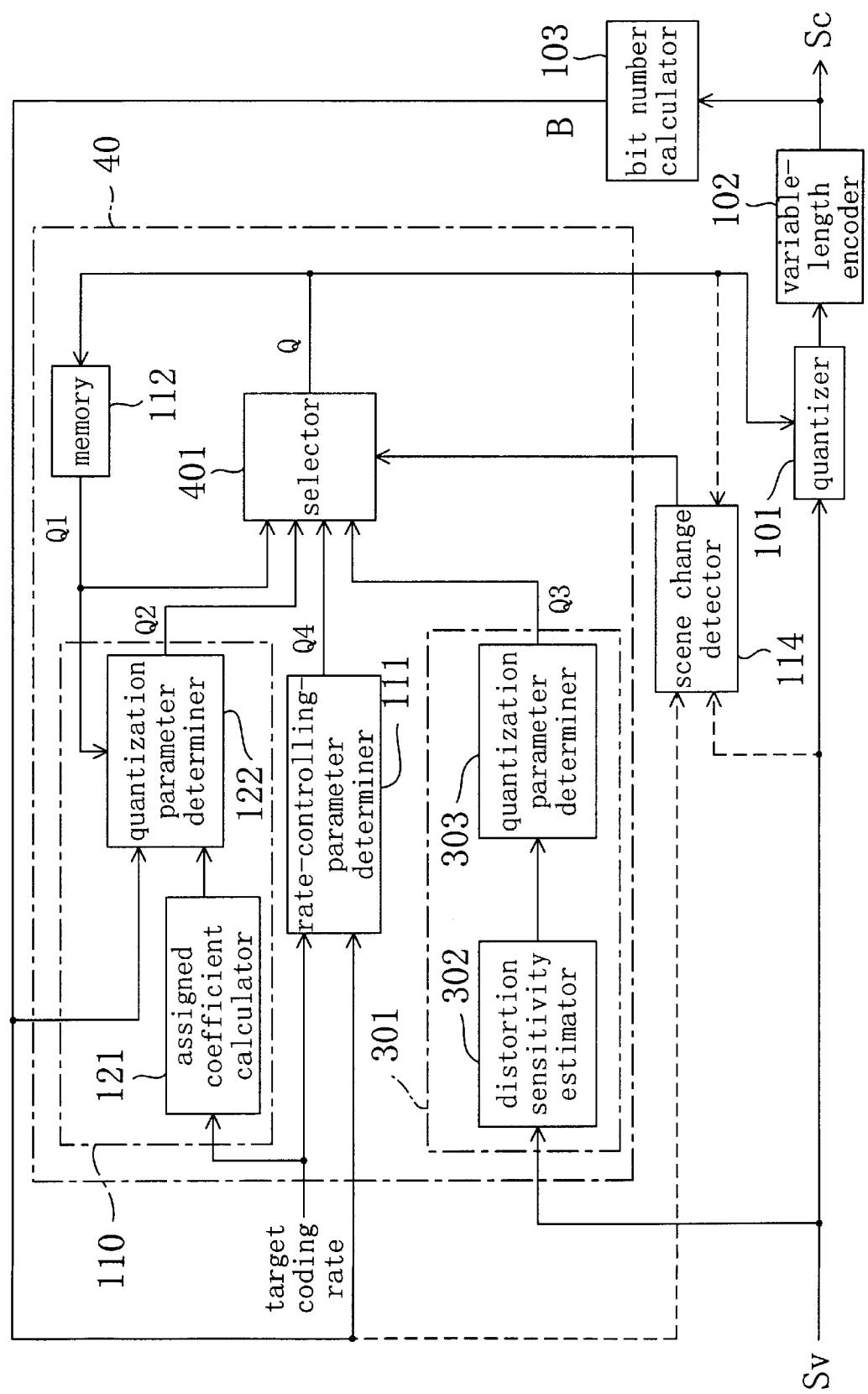
FIG. 17 is a block diagram illustrating a configuration for a coder according to a fourth embodiment of the present invention.

FIG. 17 is a block diagram illustrating a configuration for a coder according to a fourth embodiment of the present invention. In FIG. 17, the same components as those illustrated in FIGS. 1 and 13 are identified by the same reference numerals. The coder shown in FIG. 17 is based on the configuration shown in FIG. 1, but is characterized by including a plurality of scene parameter determiners. Specifically, the coder shown in FIG. 17 further includes a second scene parameter determiner 301 similar to the counterpart according to the third embodiment, in addition to the first scene parameter determiner 110. The first scene parameter determiner 110, rate-controlling-parameter determiner 111, memory 112, and second scene parameter determiner 301 together constitute quantization parameter supplying means 40 as defined in the appended claims.

Responsive to the output of the scene change detector 114, a selector 401 selectively outputs the quantization parameters Q1 through Q4 as the quantization parameter Q. That is to say, the parameter Q1 a predetermined time ago, the parameter Q2 determined and output by the first scene parameter determiner 110, the parameter Q3 determined and output by the second scene parameter determiner 301, or the parameter Q4 output from the rate-controlling-parameter determiner 111 is selectively output.

If the scene change detector 114 has detected a scene change, then the selector 401 selectively outputs the quantization parameter Q3 supplied from the second scene parameter determiner 301 for the first frame or field coming up after the scene change. When a number of bits generated after the scene change is calculated, the first scene parameter determiner 110 determines the quantization parameter Q2 based on this number of bits generated and calculated. Thereafter, the selector 401 selectively outputs the quantization parameter Q2.

(Selection of Quantization Parameter)

Figure 18:
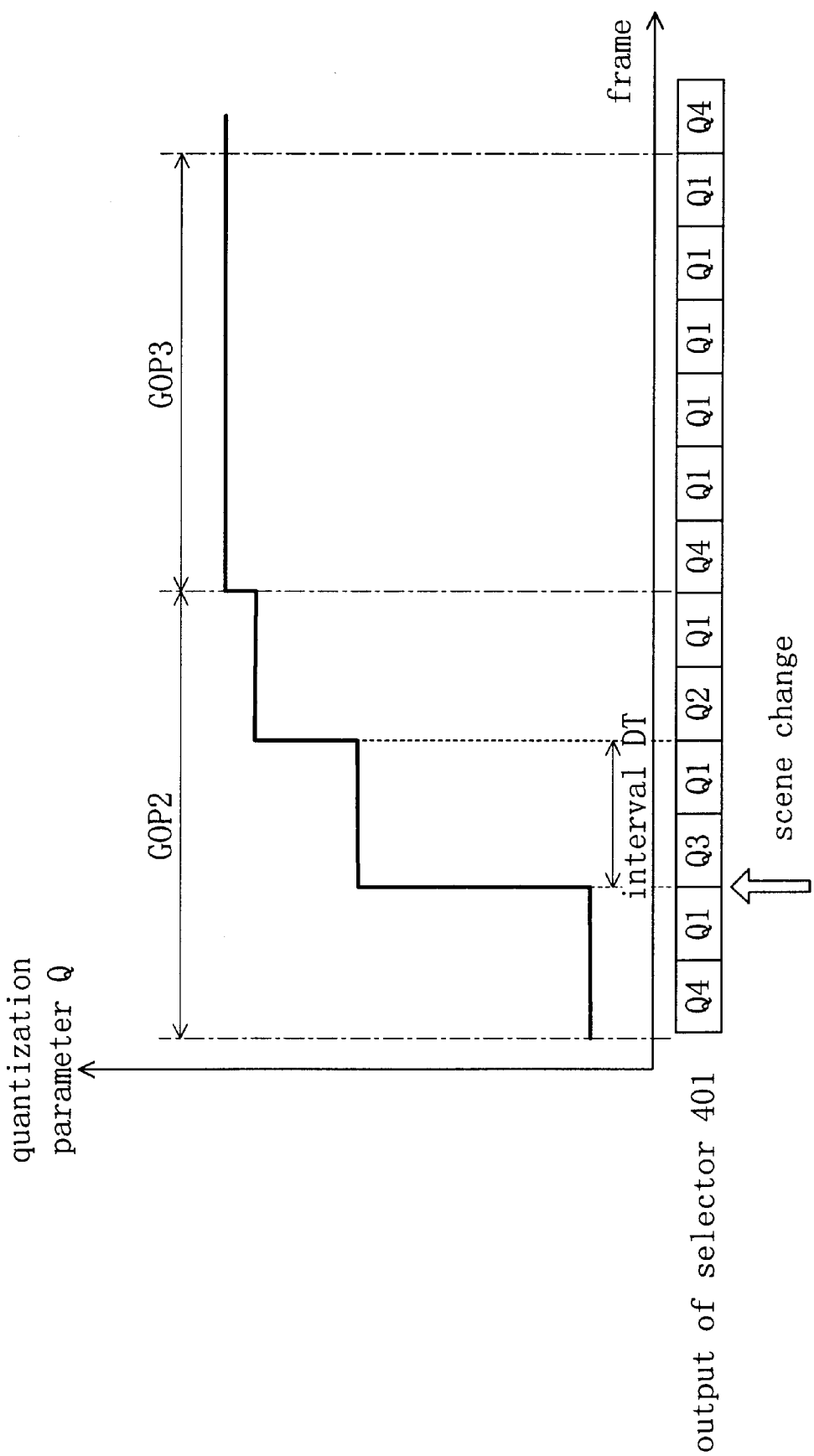
FIG. 18 illustrates the operation of selecting a quantization parameter in the coder shown in FIG. 17.

FIG. 18 illustrates the operation of the selector 401. In the example illustrated in FIG. 18, scenes are supposed to be changed within a GOP2 and the newly appearing scene is supposed to be more difficult to code as in FIG. 2A.

As shown in FIG. 18, the selector 401 selects the output Q3 of the second scene parameter determiner 301 at the first frame after the scenes have been changed within the GOP2. Since the newly appearing scene has low distortion sensitivity but is more difficult to code, the quantization parameter Q3 is set larger than the previous one as shown in FIG. 18. The quantization parameter Q3, which is selected at the first frame after the scene change, is stored on the memory 112. At the next frame, the selector 401 selects the output Q1 of the memory 112 as the quantization parameter Q. In other words, the quantization parameter Q3 that was stored on the memory 112 at the time of scene change is output as the quantization parameter Q1, and is used as the quantization parameter Q for quantization processing.

During this interval DT, the bit number calculator 103 calculates the number of bits generated after the scene change. After the interval DT has passed since the scene change, the first scene parameter determiner 110 determines the quantization parameter Q2 based on the number of bits generated after the scene change. The selector 401 selects the output Q2 of the first scene parameter determiner 110 as the quantization parameter Q.

Thereafter, the output Q2 is stored on the memory 112, and the selector 401 selects the output Q1 of the memory 112 as the quantization parameter Q. In other words, the quantization parameter Q2, which was stored on the memory 112 after the interval DT had. passed, is continuously output as the quantization parameter Q1 until the last frame of the GOP2, and is used as the quantization parameter Q for quantization processing. Next, at the first frame of GOP3, the selector 401 selects the output Q4 of the rate-controlling-parameter determiner 111 as the quantization parameter Q.

As described above, according to this embodiment, quantization processing is performed using the output Q3 of the second scene parameter determiner 301 as the quantization parameter until the interval DT has passed since the scene change. During this interval DT, the number of bits generated is calculated. And after the first scene parameter determiner 110 has determined the quantization parameter Q2 based on the number of bits generated, the quantization processing is carried out using the quantization parameter Q2 as the quantization parameter Q.

In the example shown in FIG. 18, the interval DT lasts two frames. Alternatively, the interval DT may be of an arbitrary length corresponding to a predetermined number of frames. Also, the interval DT may overlap with a pair of adjacent GOPs.

Figure 19:
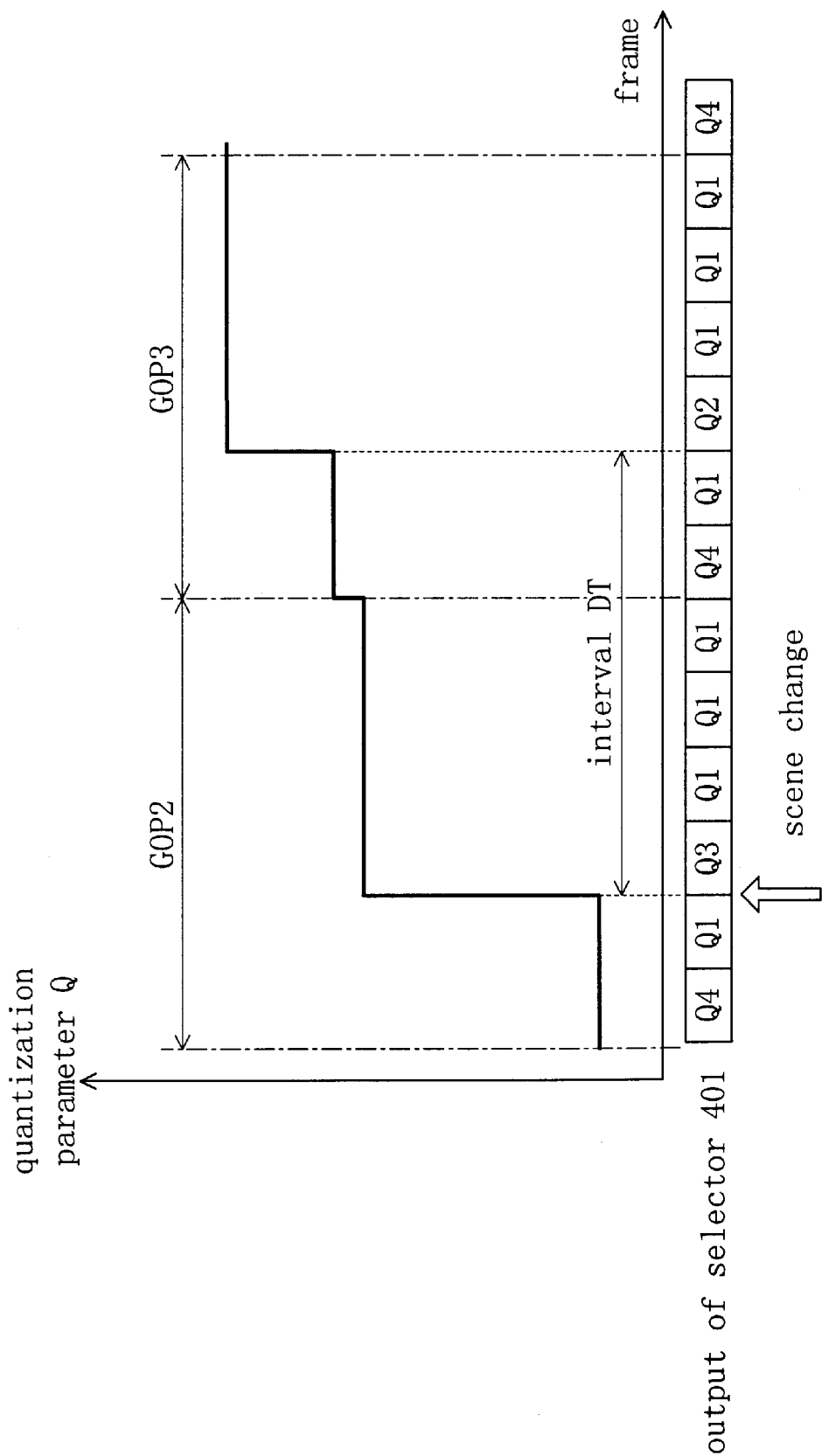
FIG. 19 illustrates the operation of selecting a quantization parameter in the coder shown in FIG. 17.

FIG. 19 illustrates how a quantization parameter is selected where the interval DT lasts six frames. In the example illustrated in FIG. 19, the interval DT reaches the next GOP3.

As shown in FIG. 19, the output Q3 of the second scene parameter determiner 301 is selected as the quantization parameter Q at the first frame after the scenes have been changed within the GOP2. At the first frame in the next GOP3, the output Q4 of the rate-controlling-parameter determiner 111 is selected as the quantization parameter Q. Thereafter, at the third frame of the GOP3, the output Q2 of the first scene parameter determiner 110 is selected as the quantization parameter Q.

Also, if coding is performed according to the MPEG-2 standard, the interval DT may be determined depending on the type of an individual frame, i.e., I-, P- or B-frame. For example, the interval DT may be defined as a period of time after the scenes was changed and until an I-frame has been coded. Alternatively, the interval DT may terminate when the coding of a P- or B-frame is completed. Furthermore, the interval DT may be an interval after the coding of an I-frame was completed and until the coding of at least one of P- and B-frames is completed.

Moreover, the interval DT may be defined as an interval after the scenes were been changed and until the coding of one GOP is completed. According to the MPEG-2 coding technique, a number of bits generated in each frame greatly differs depending on the picture type of the frame in question. Thus, a number of bits generated should preferably be calculated on a GOP basis and used as an index characterizing an individual scene.

However, to calculate a GOP bit number, the interval DT should be at least one GOP interval. Accordingly, a GOP bit number Bg may be calculated by the following conversion equation:

$$Bg=Bi+Np\times Bp+Nb\times Bb$$

where Bi, Bp and Bb are respective numbers of bits of I-, P- and B-frames, and Np and Nb are respective numbers of P-frames and B-frames included in the GOP.

By using this conversion equation, the GOP bit number Bg can be calculated on a frame basis as a bit number characterizing each scene. As a result, the interval DT can be shortened and a quantization parameter best suited to an individual scene can be determined quickly.

As described above, a first frame or field appearing after a scene change is quantized according to this embodiment using the quantization parameter Q3. And after a predetermined interval has passed, the quantization parameter Q2 is selected. In this manner, an average coding rate can be controlled to come as close to a target coding rate as possible within the same scene, and if scenes have been changed, an appropriate quantization parameter, which is most closely associated with the distortion sensitivity of the newly appearing scene, can be selected. As a result, coding processing can be performed adaptively to the individual scenes, while controlling an average coding rate at the same time. Furthermore, the quantization processing is carried out just after the scene change using an optimum quantization parameter selected based on the distortion sensitivity. And when the number of bits generated after the scene change is calculated after that, the quantization processing is performed using an optimum quantization parameter selected based on the number of bits generated.

It should be noted that the selector 401 may continuously select the output Q3 of the second scene parameter determiner 301 or the output Q4 of the rate-controlling-parameter determiner 111 as the quantization parameter Q all through the interval DT. Also, the selector 401 may always select the output Q4 of the rate-controlling-parameter determiner 111 within the same scene without supplying the output Q1 of the memory 112 to the selector 401.

Furthermore, the first scene parameter determiner 110 may have the configuration shown in FIG. 3.

EMBODIMENT 5

Figure 20:
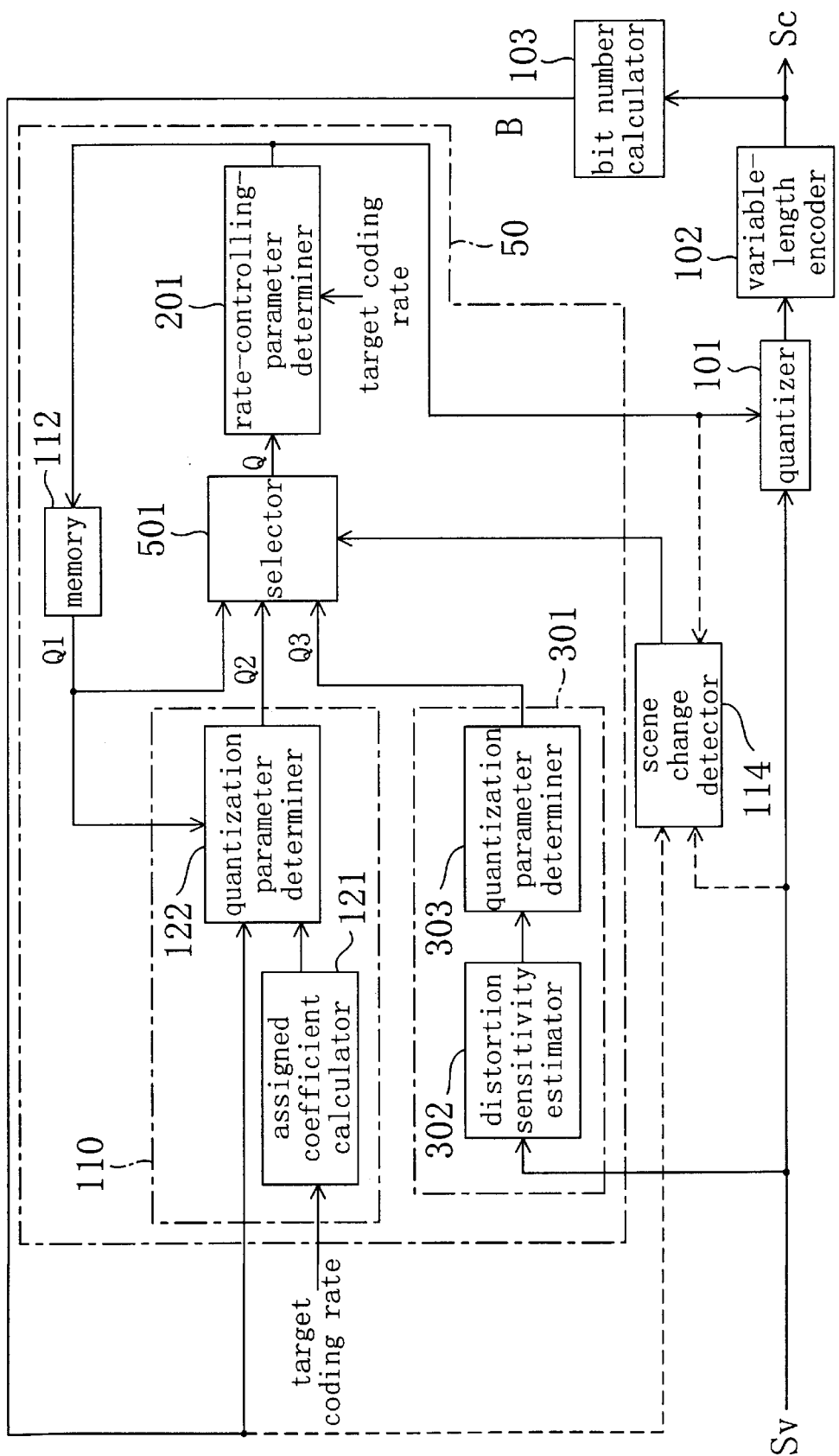
FIG. 20 is a block diagram illustrating a configuration for a coder according to a fifth embodiment of the present invention.

FIG. 20 is a block diagram illustrating a configuration for a coder according to a fifth embodiment of the present invention. In FIG. 20, the same components as those illustrated in FIGS. 12 and 13 are identified by the same reference numerals. The coder shown in FIG. 20 is based on the configuration shown in FIG. 12, but is characterized by including a plurality of scene parameter determiners as in the fourth embodiment. Specifically, the coder shown in FIG. 20 further includes the second scene parameter determiner 301 similar to the counterpart according to the third embodiment, in addition to the first scene parameter determiner 110. The first scene parameter determiner 110, memory 112, rate-controlling-parameter determiner 201, second scene parameter determiner 301 and selector 501 together constitute quantization parameter supplying means 50 as defined in the appended claims.

If the scene change detector 114 has detected a scene change, then a selector 501 selectively outputs the quantization parameter Q3 as the output Q4 at the first frame or field appearing after the scene change. Responsive to the output Q4 of the selector 501, the rate-controlling-parameter determiner 201 determines and outputs a quantization parameter Q by performing feedback control in such a manner that a cumulative error becomes zero relative to the target coding rate. The quantizer 101 performs quantization processing using the quantization parameter Q determined by the rate-controlling-parameter determiner 201. During the interval DT as defined in the fourth embodiment, the bit number calculator 103 calculates a number of bits generated after the scene change. When the first scene parameter determiner 110 determines the quantization parameter Q2 based on this number of bits generated, the selector 501 selectively outputs this quantization parameter Q2.

As described above, quantization is performed according to this embodiment using the quantization parameter Q3 at the first frame or field appearing after a scene change. And after a predetermined interval has passed, the quantization parameter Q2 is selected. In this manner, an average coding rate is controlled to come as close to a target coding rate as possible within the same scene, and if scenes have been changed, an appropriate quantization parameter, which is most closely associated with the distortion sensitivity of the newly appearing scene, is selected. As a result, coding processing can be performed adaptively to the individual scenes while controlling an average coding rate at the same time. Furthermore, the quantization processing is carried out just after the scene change using an optimum quantization parameter selected based on the distortion sensitivity. And when the number of bits generated after the scene change is calculated after that, the quantization processing is performed using an optimum quantization parameter selected based on the number of bits generated.

It should be noted that the selector 501 may continuously select the quantization parameter Q3 or the output Q1 of the memory 112 during the predetermined interval after the quantization parameter Q3 was selected and until the quantization parameter Q2 is selected.

Furthermore, the first scene parameter determiner may have the configuration shown in FIG. 3.

(Recorder)

The coders according to the foregoing embodiments are applicable to a recorder.

Figure 21:
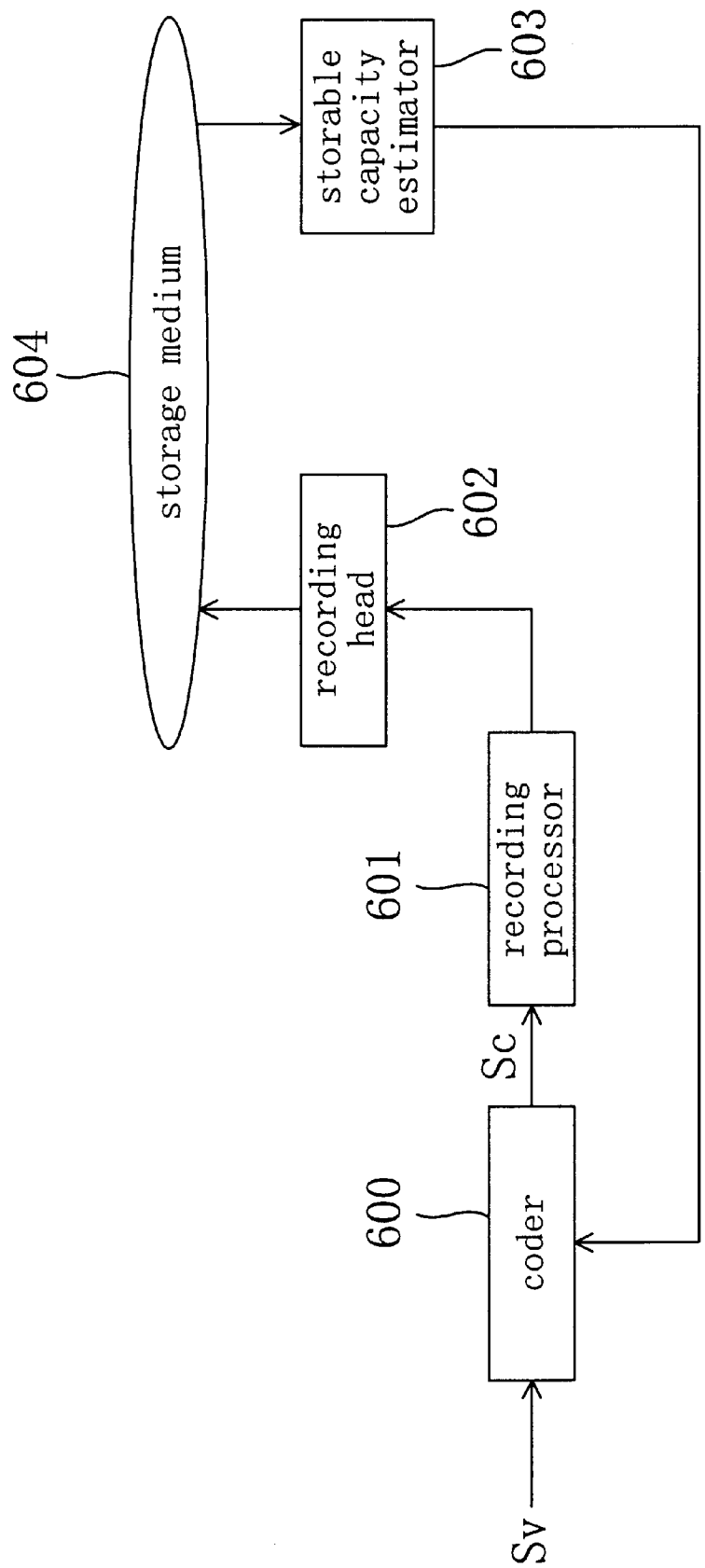
FIG. 21 is a block diagram illustrating a configuration for a recorder including a coder according to any of the embodiments of the present invention.
Figure 22:
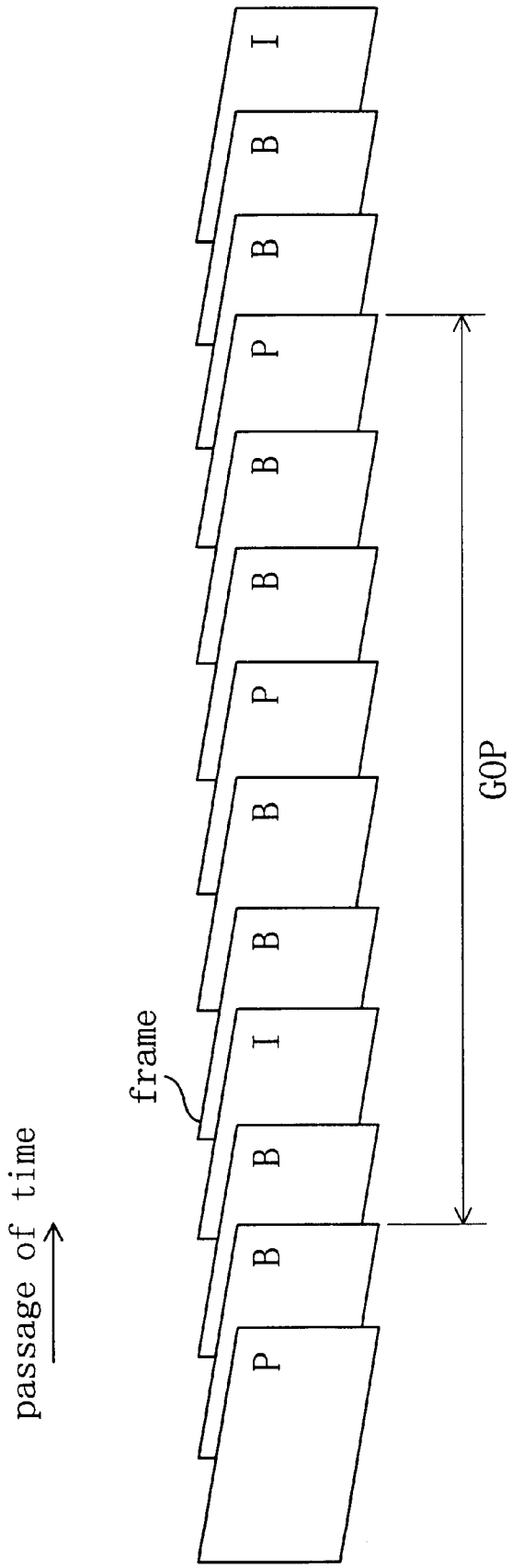
FIG. 22 illustrates respective frames appearing one after another with the passage of time according to the MPEG2 standard.

FIG. 21 is a block diagram illustrating a configuration for a recorder including a coder 600 according to any of the foregoing embodiments of the present invention. In FIG. 21, the coder 600 codes an input video signal Sv and outputs it as coded data Sc. A recording processor 601 adds an error correction code to the coded data Sc and modulates the error-corrected data into a recording signal, which is recorded by a recording head 602 on a storage medium 604.

By utilizing such a configuration, coding processing can be performed adaptively to individual scenes of a video signal, and a signal, the average coding rate of which has been controlled to be as close to the target coding rate as possible, can be recorded on the storage medium 604.

The recorder may further include a storable capacity estimator 603 for estimating a capacity of the storage medium 604 that is available for recording. And based on the storable capacity estimated, the characteristic of the quantization parameter determination processing performed by the coder 600 may be modified. In the coder according to the foregoing embodiments, the rate-controlling-parameter determiner determines the quantization parameter by feeding back the cumulative error relative to the target coding rate. In this configuration, this feedback control characteristic may be modified based on the storable capacity estimated by the storable capacity estimator 603.

For example, if there is a lot of storable capacity left, the feedback control is performed gently so as to decrease a variation in quantization parameter. Conversely, if there is little storable capacity left, then the feedback control is enhanced. That is to say, when there is a lot of storable capacity left, the coding processing is performed adaptively to individual scenes. And when there is little storable capacity left, the feedback control is performed more precisely such that the average rate comes even closer to the target rate. In this manner, the recording signal can be recorded on the storage medium with much more certainty.

It should be noted that the characteristic of the feedback control may be modified in any arbitrary manner. For example, the time constant or quantity of the feedback control may be changed.

In the foregoing example, the feedback control characteristic of the rate-controlling-parameter determiner is supposed to be modified based on the storable capacity. Alternatively, the characteristic of quantization parameter determination performed by the scene parameter determiner may be modified instead. For example, when there is not so much storable capacity left, the quantization parameter to be output may be increased so as to decrease the coding rate and thereby extend the video signal recordable time.

Also, the target coding rate may be corrected based on the storable capacity. For example, as the error between the target coding rate and the actual coding rate is getting non-negligible along with the progress of the coding processing, the estimated storable capacity is also getting more and more erroneous. Accordingly, if the target coding rate is changed in accordance with the storable capacity and the remaining video signal recording time, then the video signal can be recorded on the storage medium with a lot more certainty.

In the foregoing embodiments, hardware implementations of the coder and recorder according to the present invention are exemplified. Alternatively, the inventive coder and recorder may be implemented by means of software, or computer-executable programs. In such a situation, the respective components of the coder or recorder are equivalent to, and easily replaceable with, respective processing steps of coding and recording methods according to the present invention.

Also, each image may be divided into a plurality of blocks each composed of a multiplicity of pixels, an orthogonal transform such as discrete cosine transform may be performed on a block-by-block basis, and then the transform coefficients may be quantized and variable-length encoded. In such a case, quantization parameters may be defined for respective transform coefficients using the coder according to any of the foregoing embodiments of the present invention. As another alternative, quantization parameters may be defined for respective blocks by the method of the present invention and the quantization parameter of each transform coefficient may be determined adaptively to the quantization parameter of an associated block.

It should be noted that the present invention is applicable to various types of coding processing, e.g., transform coding based on orthogonal transform, sub-band coding using a plurality of frequency bands divided, and vector quantization for quantizing a plurality of pixel levels into representative vectors.

In the foregoing embodiments, a quantization parameter is just an exemplary parameter used for controlling the compression ratio in coding processing. Accordingly, if the compression ratio of a signal should be controlled using any other parameter, then the present invention is implementable as a method for determining the compression ratio control parameter.

As is apparent from the foregoing description, the present invention can perform coding processing adaptively to individual scenes while controlling an average coding rate at the same time. Accordingly, a well-balanced signal of quality can be reproduced at an even lower coding rate.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A method for coding a signal representing a video or being accompanied with a video by quantization processing, the method comprising the steps of:

detecting a scene change in the video;

if the scene change has been detected, determining a quantization parameter adaptively to a scene newly appearing after the scenes have been changed; or unless the scene change is detected, determining the quantization parameter at such a value as to stabilize a coding rate; and performing the quantization processing using the quantization parameter determined, wherein if the scene change has been detected, a complexity of coding (X) is computed based on the quantization parameter (Q) and a number of bits generated (B), which are related as a function of B=f(X,Q), and bit assignment is performed so as to minimize the average of quantization parameter.

2. The method of claim 1, wherein the complexity of coding is given as the product of the number of bits generated and the quantization parameter.

3. A method for coding a signal representing a video or being accompanied with a video by quantization processing, the method comprising the steps of:

detecting a scene change in the video;

if the scene change has been detected, determining a quantization parameter adaptively to a scene newly appearing after the scenes have been changed; or unless the scene change is detected, determining the quantization parameter at such a value as to stabilize a coding rate; and performing the quantization processing using the quantization parameter determined, wherein if the scene change has been detected, the quantization parameter is determined based on an assigned coefficient, corresponding to a complexity of coding the signal, and a number of bits generated and calculated during a predetermined interval after the scene change, and bit assignment is performed such that if the complexity is higher, the coding rate gets higher, while if the complexity is lower, the coding rate gets lower.

4. The method of claim 3, wherein the assigned coefficient is obtained based on a target coding rate.

5. The method of claim 3, wherein the assigned coefficient is obtained based on an average of quantization parameters during a predetermined interval before the scene change is detected and an average of numbers of bits generated during the predetermined interval.

6. A method for coding a signal representing a video or being accompanied with a video by quantization processing, the method comprising the steps of:

detecting a scene change in the video;

if the scene change has been detected, determining a quantization parameter adaptively to a scene newly appearing after the scenes have been changed; or unless the scene change is detected, determining the quantization parameter at such a value as to stabilize a coding rate; and performing the quantization processing using the quantization parameter determined, wherein unless the scene change is detected, an accumulation of errors, each representing a difference between a number of bits generated and a target number of bits, is obtained, and the quantization parameter is determined by a feedback control using the accumulation, wherein a property of the feedback control is determined according to a number of bits assigned when the scene change has been detected.

7. The method of claim 6, wherein a characteristic of the feedback control is modified based on the errors.

8. The method of claim 6, wherein a time passed since coding processing was started is clocked, and the characteristic of the feedback control is modified based on the passed time clocked.

9. The method of claim 1, wherein if the scene change has been detected, a distortion sensitivity of the video after the scene change is detected, and the quantization parameter is determined based on the distortion sensitivity detected.

10. The method of claim 1, wherein if the scene change has been detected, a distortion sensitivity of the video after the scene change is detected, and a first quantization parameter is determined based on the distortion sensitivity detected, and wherein a number of bits generated during a predetermined interval after the scene change is calculated, and a second quantization parameter is determined based on the number of bits generated and calculated.

11. The method of claim 1, further comprising the step of estimating a storable capacity of a storage medium while recording coded data on the storage medium, wherein the quantization parameter is determined considering the storable capacity estimated as well.

12. A coder for coding a signal representing a video or being accompanied with a video, the coder comprising:

a quantizer for quantizing the signal;

an encoder for encoding the output of the quantizer and outputting coded data;

means for supplying a quantization parameter to the quantizer; and means for detecting a scene change in the video, wherein if the detecting means has detected the scene change, the supplying means supplies a quantization parameter, which has been determined adaptively to a scene newly appearing after the scene change, to the quantizer, wherein unless the detecting means detects the scene change, the supplying means supplies a quantization parameter, which has been determined at such a value as to stabilize a coding rate, to the quantizer, and wherein if the scene change has been detected, a complexity of coding (X) is computed based on the quantization parameter (Q) and a number of bits generated (B), which are related as a function of B=f(X,Q), and bit assignment is performed so as to minimize the average of quantization parameter.

13. The coder of claim 12, wherein the complexity of coding is given as the product of the number of bits generated and the quantization parameter.

14. A method for coding a signal by quantization processing, the method comprising the steps of:

obtaining an accumulation of errors, each representing a difference between a number of bits generated and a target number of bits;

determining a quantization parameter by a feedback control using the accumulation; and performing the quantization processing using the quantization parameter determined, wherein a time passed since coding processing was started is clocked, and a characteristic of the feedback control is modified based on the passed time clocked.

15. The coder of claim 14, wherein the supplying means obtains the assigned coefficient based on a target coding rate.

16. The coder of claim 14, wherein the supplying means obtains the assigned coefficient based on an average of quantization parameters during a predetermined interval before the scene change is detected and an average of numbers of bits generated during the predetermined interval.

17. A coder for coding a signal representing a video or being accompanied with a video, the coder comprising:

a quantizer for quantizing the signal;

an encoder for encoding the output of the quantizer and outputting coded data;

means for supplying a quantization parameter to the quantizer; and means for detecting a scene change in the video, wherein if the detecting means has detected the scene change, the supplying means supplies a quantization parameter, which has been determined adaptively to a scene newly appearing after the scene change, to the quantizer, wherein unless the detecting means detects the scene change, the supplying means supplies a quantization parameter, which has been determined at such a value as to stabilize a coding rate, to the quantizer, wherein unless the detecting means detects the scene change, the supplying means obtains an accumulation of errors each representing a difference between a number of bits generated and a target number of bits, and determines the quantization parameter by a feedback control using the accumulation, and wherein a property of the feedback control is determined according to a number of bits assigned when the scene change has been detected.

18. A coder for coding a signal representing a video or being accompanied with a video, the coder comprising:

a quantizer for quantizing the signal;

an encoder for encoding the output of the quantizer and outputting coded data;

means for supplying a quantization parameter to the quantizer; and means for detecting a scene change in the video, wherein if the detecting means has detected the scene change, the supplying means supplies a quantization parameter, which has been determined adaptively to a scene newly appearing after the scene change, to the quantizer, wherein unless the detecting means detects the scene change, the supplying means supplies a quantization parameter, which has been determined at such a value as to stabilize a coding rate, to the quantizer, and a bit number calculator for calculating a number of bits of the coded data, wherein when the detecting means detects the scene change, the supplying means determines the quantization parameter based on an assigned coefficient, corresponding to a complexity of coding the signal, and the number of bits calculated by the calculator during a predetermined interval after the scene change, and wherein bit assignment is performed such that if the complexity is higher, the coding rate gets higher, while if the complexity is lower, the coding rate gets lower.

19. The coder of claim 17, wherein the supplying means clocks a time passed since coding processing was started, and modifies the characteristic of the feedback control based on the passed time clocked.

20. The coder of claim 12, wherein when the detecting means detects the scene change, the supplying means detects a distortion sensitivity of the video after the scene change, and determines the quantization parameter based on the distortion sensitivity detected.

21. The coder of claim 12, further comprising a bit number calculator for calculating a number of bits of the coded data, wherein when the detecting means detects the scene change, the supplying means detects a distortion sensitivity of the video after the scene change, and determines a first quantization parameter based on the distortion sensitivity detected, and wherein after a predetermined interval has passed, the supplying means determines a second quantization parameter based on the number of bits calculated by the bit number calculator.

22. A recorder for recording a signal, representing a video or being accompanied with a video, on a storage medium, wherein the recorder includes the coder as recited in claim 12, and records the coded data, which has been output from the coder, on the storage medium.

23. The recorder of claim 22, further comprising means for estimating a storable capacity of the storage medium, wherein the means for supplying a quantization parameter of the coder determines the quantization parameter considering the storable capacity estimated by the estimating means as well.

* * * * *

UNITED STATES PATENT AND TRADEMARK OFFICE
CERTIFICATE OF CORRECTION

PATENT NO. : 6,532,262 B1  Page 1 of 1
DATED : March 11, 2003
INVENTOR(S) : Hideki Fukuda et al.

It is certified that error appears in the above-identified patent and that said Letters Patent is hereby corrected as shown below:

<u>Column 28,</u>
Lines 44-55, please delete claim 14; and

<u>Column 30,</u>
After line 41, please insert the following:
-- 24. The codes of claim 17, wherein the supplying means modifies a characteristic of the feedback control based on the errors. --

Signed and Sealed this

Twenty-first Day of October, 2003

JAMES E. ROGAN
*Director of the United States Patent and Trademark Office*